(12) United States Patent
Kosierkiewicz

(10) Patent No.: US 9,199,766 B1
(45) Date of Patent: Dec. 1, 2015

(54) CONTAINER TIME INDICATOR WITH A DEVICE FOR INHIBITING THE REMOVAL OF THE CAP

(71) Applicant: Tomasz Andrzej Kosierkiewicz, Mount Vernon, IL (US)

(72) Inventor: Tomasz Andrzej Kosierkiewicz, Mount Vernon, IL (US)

(*) Notice: Subject to any disclaimer, the term of this patent is extended or adjusted under 35 U.S.C. 154(b) by 92 days.

(21) Appl. No.: 13/975,866

(22) Filed: Aug. 26, 2013

Related U.S. Application Data

(63) Continuation-in-part of application No. 12/772,188, filed on May 1, 2010, now abandoned, which is a continuation-in-part of application No. 12/541,942, filed on Aug. 15, 2009, now abandoned.

(60) Provisional application No. 61/787,581, filed on Mar. 15, 2013.

(51) Int. Cl.
 *B65D 83/04* (2006.01)
 *B65D 25/00* (2006.01)

(52) U.S. Cl.
 CPC .................................... *B65D 25/00* (2013.01)

(58) Field of Classification Search
 CPC .... B65D 83/04; B65D 55/10; B65D 55/0872; B65D 55/022; B65D 55/02; B65D 50/062; B65D 50/00; B65D 41/04; A61J 1/03; A61J 7/04

USPC ........................ 215/230; 206/459.1, 540, 534
 See application file for complete search history.

(56) References Cited

U.S. PATENT DOCUMENTS

| | | | | |
|---|---|---|---|---|
| 4,512,485 A | * | 4/1985 | Agbay et al. | 215/225 |
| 4,782,963 A | * | 11/1988 | Hunter | 215/206 |
| 4,802,438 A | * | 2/1989 | DeJonge | 116/308 |
| 5,277,325 A | * | 1/1994 | Yan | 215/206 |
| 5,611,444 A | * | 3/1997 | Garby et al. | 215/230 |
| 5,662,224 A | * | 9/1997 | Nogues | 206/534 |
| 5,819,967 A | * | 10/1998 | Lo | 215/206 |
| 5,899,348 A | | 5/1999 | Konefal et al. | |
| 6,089,180 A | * | 7/2000 | Nichols, Jr. | 116/309 |
| 6,805,072 B1 | | 10/2004 | DeSano | |

* cited by examiner

*Primary Examiner* — Anthony Stashick
*Assistant Examiner* — Robert Poon
(74) *Attorney, Agent, or Firm* — Craig Hoersten

(57) ABSTRACT

A time programmable container for timing an object, having a spacer which is positioned intermediate a lid and a base. The spacer and the base contain time indicia that correspond to a plurality of a different of time indication. The base includes a device to secure the spacer and inhibit the movement or rotation of the spacer with respect to the base. The cap removal inhibiting device includes a cavity with a lip and a tab spacer, such that when the spacer is placed upon the base and the lid is threaded onto the base, the tab of the spacer extends into the cavity of the lid, thereby securing the spacer onto the base and further preventing the removal of the lid from the base without first removing the tab from the cavity.

6 Claims, 25 Drawing Sheets

CONTAINER TIME INDICATOR WITH A DEVICE FOR INHIBITING THE REMOVAL OF THE CAP

CROSS-REFERENCE TO RELATED APPLICATIONS

This application claims the benefit of U.S. Provisional Application No. 61/787,581, filed Mar. 15, 2013, and is a continuation-in-part of U.S. application Ser. No. 12/772,188, filed May 1, 2010, pending, which is a continuation-in-part of U.S. application Ser. No. 12/542,942, filed Aug. 15, 2009, now abandoned, the disclosures of these applications are incorporated herein by reference.

TECHNICAL FIELD

The present application is generally related to a container having programmable time indicator and more particular to a container or bottle having a programmable time indicator integrated with a device to inhibit or substantially inhibit the opening of the container or bottle by a targeted group of people or users.

BACKGROUND

Often concentrated substances need to be preserved, usually in the form of a liquid or powder, which are dissolved in a solvent, generally composed of water, only at the time they are used. Typically this occurs, for example, in the domestic area for advance preparation of fertilizers, medicines, herbicides or other similar solutions.

The fact that these substances can be kept in sealed containers enables the following advantages: first, a bottle or similar container can be filled with the desired solution only when there is an actual need to use it, and second, many of the substances mentioned above tend to deteriorate over time once they are put in solution, but retain their quality for extremely long periods of time if kept in an essentially airtight package.

These containers may also apply to children's beverage containers. Once these containers have been filled with a liquid such as milk or juice, these beverage containers have to be consumed within a certain timeframe. Furthermore, caregivers within institutions often find a multitude of these containers within a refrigerator in various stages of use. These containers may be full, partially full or near empty so that there is a need for an indication as to when the container was originally filled.

SUMMARY

A time programmable container for timing an object may include a base for containing the object, a lid for sealing the base member, and a spacer which may rotate on the base in a first position and may lock onto the base in a second position.

The spacer may include time indicia adapted to be aligned to a marker of the base member The base may include a locking device to lock the spacer after it is aligned.

The locking device may include a finger to cooperate with a depression of the spacer member.

The base may be threadably connected to the lid member.

The lid and spacer may include a device or mechanism, that when engaged, substantially inhibits the opening of the lid member.

DETAILED DESCRIPTION

Figure 1:
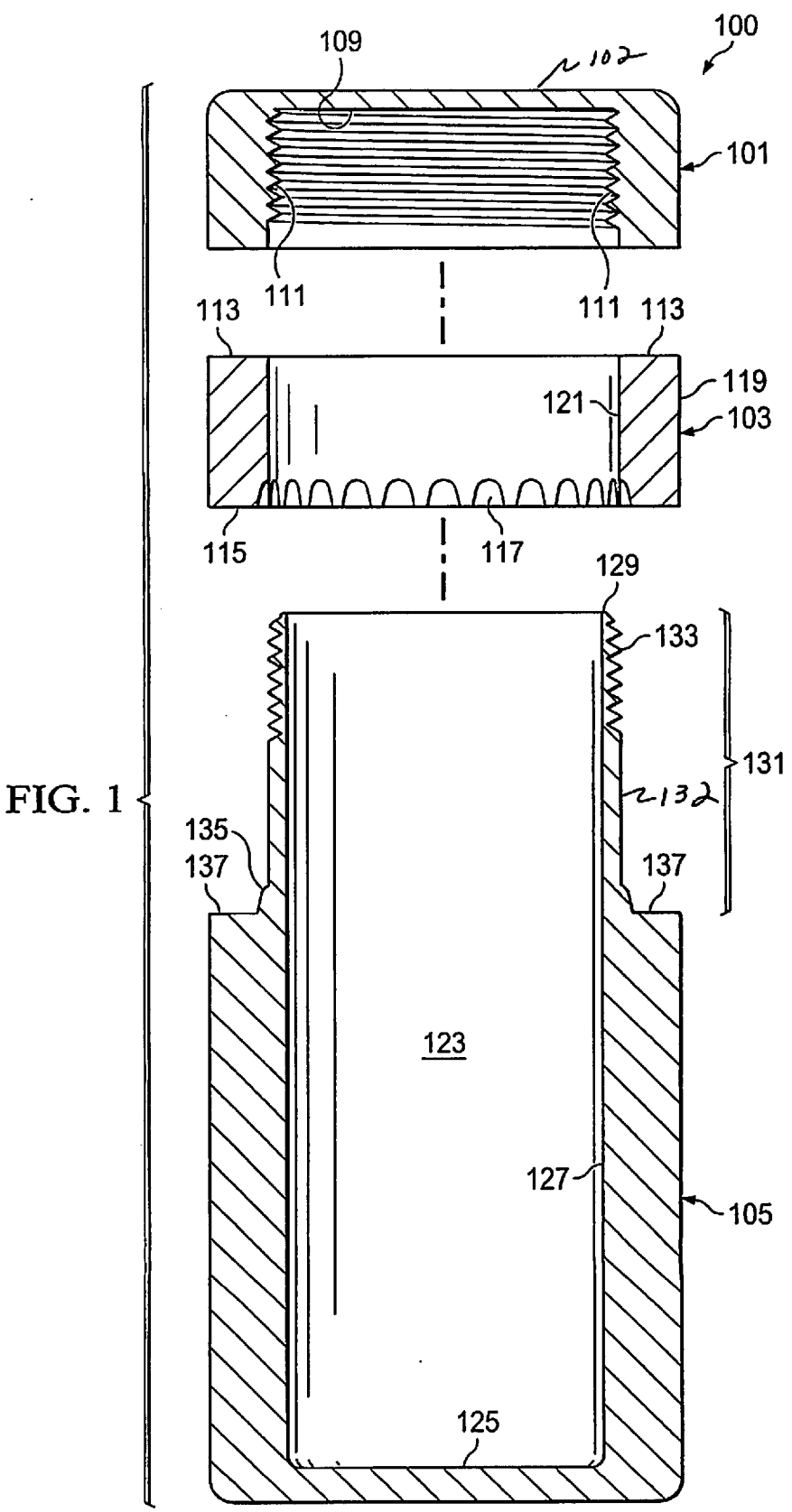
FIG. 1 illustrates an exploded cross-sectional view of the time programmable container of the present invention.

As used herein, the use of the word "a" or "an" when used in conjunction with the term "comprising" in the claims and/or the specification may mean "one", but it is also consistent with the meaning of "one or more," "at least one", and "one or more than one". Still further, the terms "having", "including", "containing" and "comprising" are interchangeable and one of skill in the art is cognizant that these terms are open-ended terms. Some embodiments of the invention may consist of or consist essentially of one or more elements, method steps, and/or methods of the invention. It is contemplated that any method or composition described herein can be implemented with respect to any other method or composition described herein.

Referring now to the drawings, wherein various elements depicted therein are not necessarily drawn to scale and wherein through the various views and figures like elements may be referenced with identical references numerals, there is illustrated embodiments of a time programmable container according to the principles of the present invention.

Referring now to FIGS. 1-6, there is illustrated an embodiment of a time programmable container 100. As illustrated time programmable container 100 includes a lid 101, a spacer 103 and a base 105. Lid 101 is used to seal the time programmable container 100. Spacer 103 cooperates with the lid 101 and base 105 and is used to provide an indication of time (see for example FIGS. 6, 14 and 24), which may be selected or programmed from a plurality of indications. Base 105 is configured with a storage region 123 and is used to contain time sensitive material such as solids, liquids, medicines, food and other appropriate materials.

Spacer 103 and the corresponding time indicia may be programmed to indicate various properties of the materials contained within base 105, such as but not limited to: the time that the container was filled; the last time the container was either opened or closed; an expiration time for the materials stored therein. As can be appreciated the materials from which the elements of time programmable container 100 can be any of a number of rigid and flexible materials, such as, but not limited to various plastics, glass, and metals, or other appropriate material. Although, the time programmable container 100 is illustrated as an elongated cylinder, it is contemplated that other shapes such as rectangle, oval or other shapes and combinations of shapes could be used.

The lid 101 includes an upper exterior surface 102 which is in a spaced relationship with the upper interior surface 109. Upper interior surface 109 extends to the side interior surface 111. Side interior surface 111 extends around the inner periphery of the lid 101. The side interior surface 111 is a threaded surface and used to mate with threads 133 of base 105.

The spacer 103 is ringed shaped and includes a central aperture which extends through the spacer 103. The spacer 103 includes a top surface 113 which extends around the periphery of the spacer 103. The top surface 113 is intermediate and connects to the exterior surface 119 and the interior surface 121 of spacer 103. The exterior surface 119 and the interior surface 121 define a bottom surface 115. Bottom surface 115 includes a plurality of depressions or indentations 117 which extend around the interior surface 121 and extend from bottom surface 115 up into spacer 103 and include an arcuate top portion distal from bottom surface 115. It is contemplated that the number of depressions 117 utilized will depend upon the number of alignments for spacer 103 as desired by the user.

As illustrated, the base 105 is an elongated cylinder having a central storage region 123 to hold articles or liquids. The storage region 123 is defined by a base inner bottom surface 125 and a base inner side surface 127 which extends around the periphery of the base 105. The base 105 includes a base top surface 129 which extends around the periphery of the base 105 and cooperates with the upper inner surface 109 of lid 101 to form a seal. The base 105 includes a neck portion 131 which extends around the periphery of the base 105 and includes a threaded portion 133 which are configured to cooperate or mate with the threads of the side interior surface 111 of lid 101. The neck portion 131 also includes an unthreaded portion 132 which is configured to slidably engage the spacer 103. A shoulder 137 extends around the periphery of base 105 and is located at the bottom portion of the neck portion 131 opposite top surface 129.

The base 105 further includes a radial finger 135 which extends from the shoulder 137 and up neck portion 131 into the unthreaded portion 132, with the top portion of each of the radial fingers including an arcuate portion that is complementary of the arcuate portion of depression 117. The radial finger 135 is configured to only cooperate with a single depression 117 at a time of the plurality of depressions so that when the spacer 103 is placed over the neck 131 and onto the shoulder 137, the radial finger 135 will be positioned within a single depression 117, such that when the lid 101 is threadably engaged with the base 105 and the interior surface 109 of lid 101 is engaging top surface 129 of base 105, the finger 135 is inserted or engaged with depression 117 and will prevent the spacer 103 from rotating about base 105. As illustrated the shape and size of radial fingers 135 is a complement of the shape and size of depressions 117.

Figure 6:
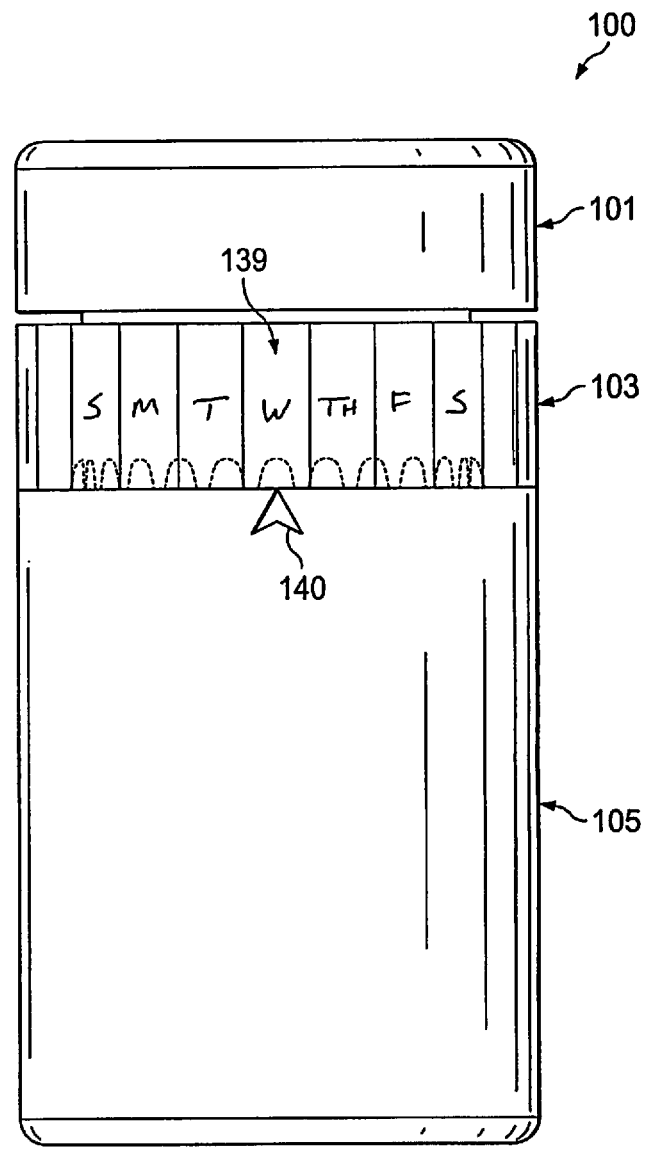
FIG. 6 illustrates a front view of the time programmable container of the present invention.
Figure 7:
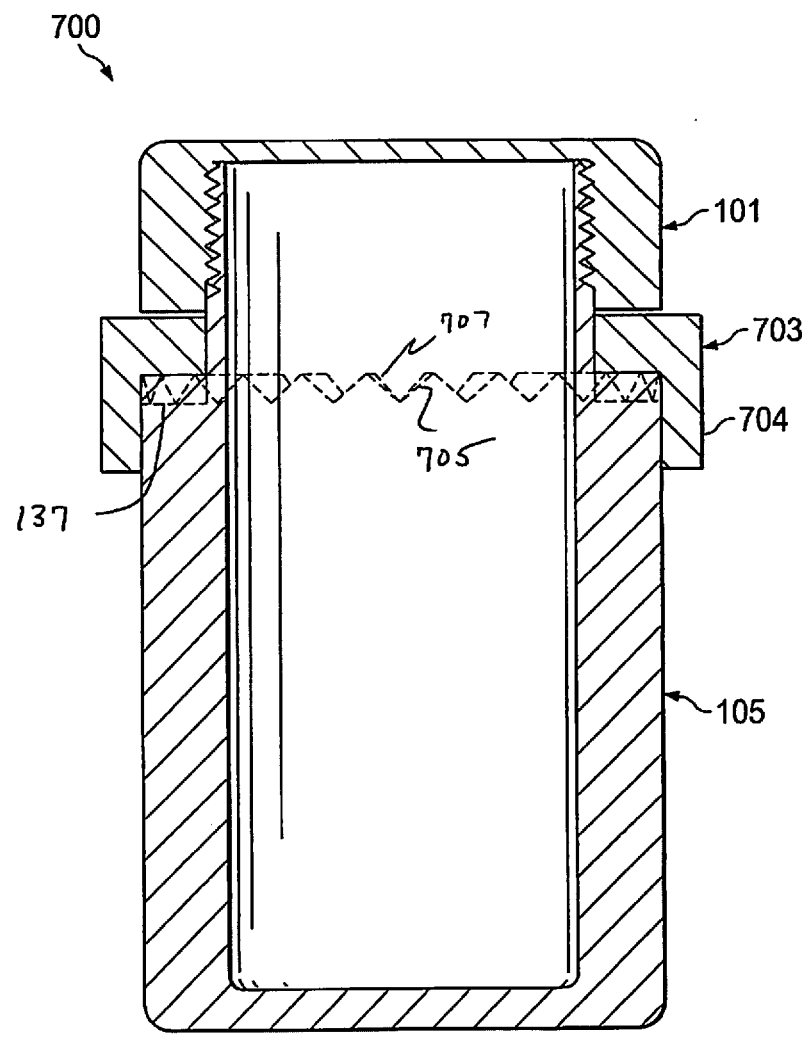
FIG. 7 illustrates a cross-sectional view of an alternative embodiment of a time programmable container of the present invention.
Figure 8:
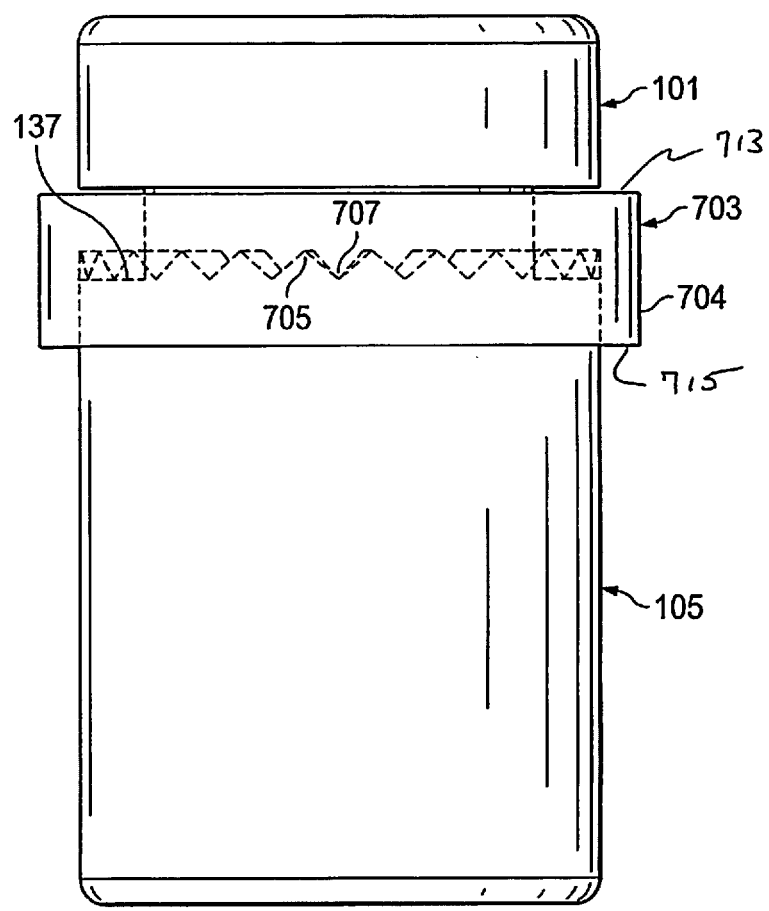
FIG. 8 illustrates a front view of the time programmable container of the present invention as similarly shown in FIG. 7.
Figure 9:
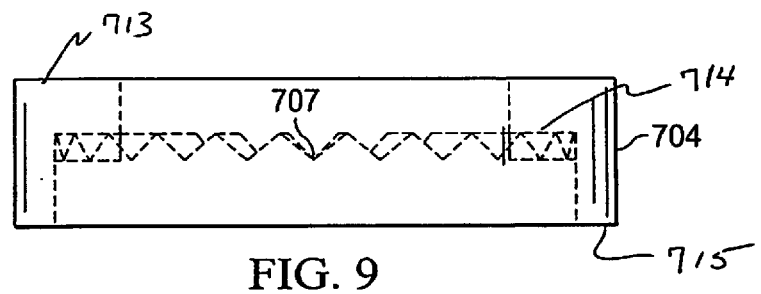
FIG. 9 illustrates the spacer of the time programmable container of the present invention as similarly shown in FIG. 8.
Figure 10:
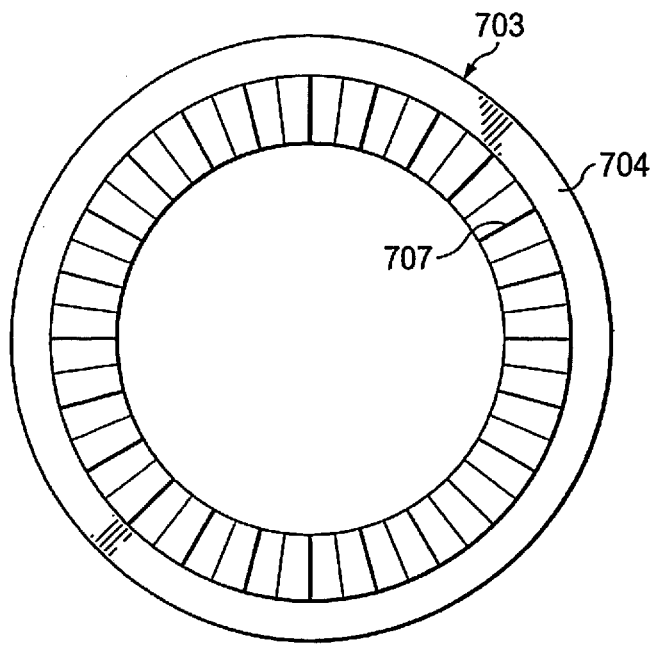
FIG. 10 illustrates a bottom view of the spacer of the present invention as similarly shown in FIGS. 7-9.

As illustrated in FIG. 6 (and FIGS. 14, 15 and 25), the spacer 103 and base 105 include time indicia 139 (and 161 and 165). The time indicia may correspond to various types of time indications, such as, but not limited to days of the week, and periods of time such as minutes, hours, days, weeks, months or years. These indicia may be utilized to indicate the period of time to associate with the articles or liquids within the central storage region 123. Additionally, an arrow or pointer 140 and 163 can be placed on the base 105 and used to cooperate with any of the used time indicia.

In operation, a user will identify a desired time indicator on spacer 103. With the lid 101 and spacer 103 removed from base, the user will take spacer 103 and start to place it over the neck 131. Prior to the radial finger 135 engaging any of the depressions 117, the user will rotate the spacer 103 clockwise or counterclockwise, sequentially or non-sequentially about the neck 131 of the base 105 until the desired time indicator is in alignment with the arrow 140. Upon alignment, the user will then proceed to slide spacer 103 over the neck 131 until the bottom surface 115 engages shoulder 137 and finger 135 is inserted into a corresponding aligned indentation 117. Subsequent to the placement of the spacer 103 onto the shoulder 137, the user places the lid 101 onto the top of neck 131 such that the threads of interior surface 111 engage with the threads of threaded portion 133. The user then rotates the lid 101 down onto the neck 131 until the upper surface 129 of base 105 engages upper surface 109 of lid 101. When positioned as such, the lid 101 is positioned close to or proximate with or even engaged with, the spacer 103 so as to prevent the spacer 103 from moving in an upward motion along neck 131. Additionally, when the lid is in such position, the finger 135 is engaged with indentation 117, this locks or prevents the rotation of space 103 about the neck 131 of base 105. Once spacer 103 is placed onto shoulder 137, the arrow 140 will be in alignment with the selected time indicator. (See for example FIGS. 5, 6, 19, 20 and 24).

Figure 2:
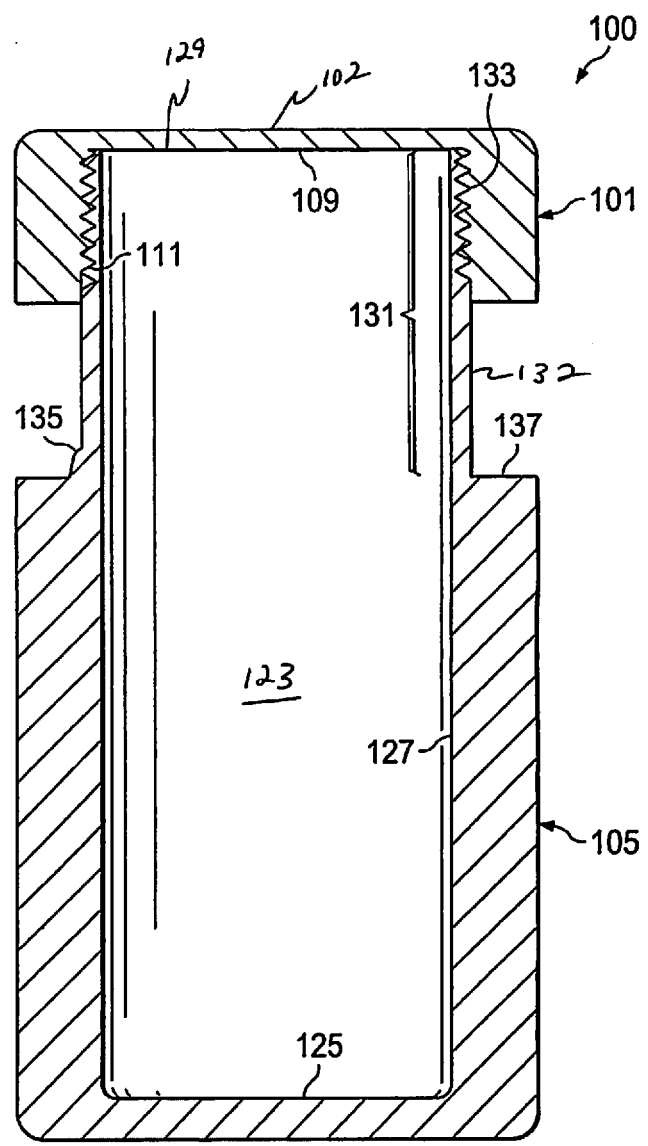
FIG. 2 illustrates a cross-sectional view of the time programmable container of the present invention without the spacer member.

Referring now in particular to FIG. 2, there is illustrated the programmable container 100 as illustrated in FIG. 1 with the spacer 103 removed and the lid 101 secured to base 105. As described with reference to FIG. 1, time programmable container 100 includes a lid 101 and a base 105. Lid 101 is used to seal the time programmable container 100. Base 105 is configured with a storage region 123 and is used to contain time sensitive material such as solids, liquids, medicines, food and other appropriate materials.

The lid 101 includes an upper exterior surface 102 which is in a spaced relationship with the upper interior surface 109. Upper interior surface 109 extends to the side interior surface 111. Side interior surface 111 extends around the inner periphery of the lid 101. The side interior surface 111 is a threaded surface and used to mate with threads 133 of base 105.

As illustrated, the base 105 is an elongated cylinder having a central storage region 123 to hold articles or liquids. The storage region 123 is defined by a base inner bottom surface 125 and a base inner side surface 127 which extends around the periphery of the base 105. The base 105 includes a base top surface 129 which extends around the periphery of the base 105 and cooperates with the upper inner surface 109 of lid 101 to form a seal. The base 105 includes a neck portion 131 which extends around the periphery of the base 105 and includes a threaded portion 133 which are configured to cooperate or mate with the threads of the side interior surface 111 of lid 101. The neck portion 131 also includes an unthreaded portion 132 which is configured to slidably engage the spacer 103. A shoulder 137 extends around the periphery of base 105 and is located at the bottom portion of the neck portion 131 opposite top surface 129. The base 105 further includes a radial finger 135 which extends from the shoulder 137 and up neck portion 131 into the unthreaded portion 132.

Figure 3:
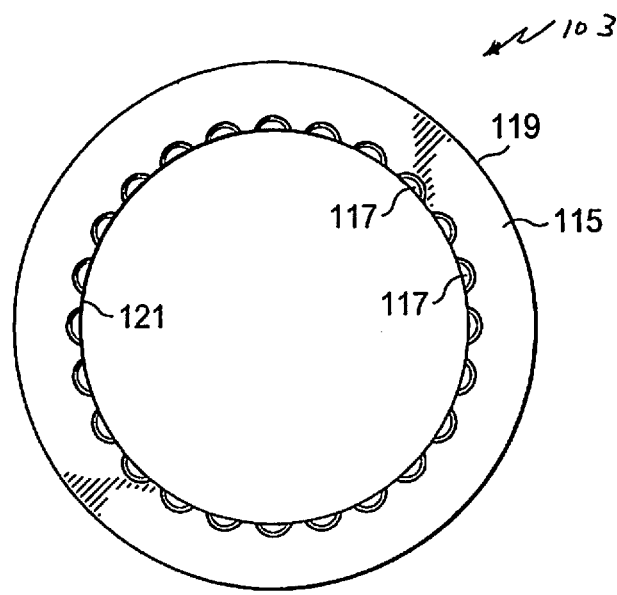
FIG. 3 illustrates a bottom view of the spacer of the present invention.
Figure 4:
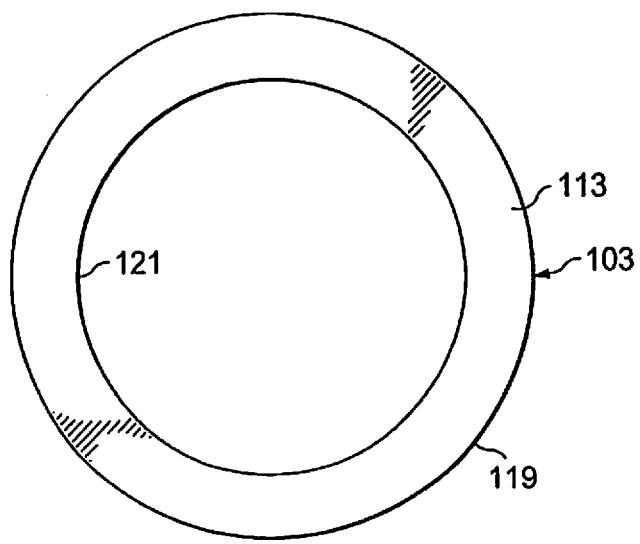
FIG. 4 illustrates a top view of the spacer of the present invention.

Referring now to FIGS. 3 and 4, there is illustrated more detailed view of the spacer 103, with FIG. 3 being a bottom view of the spacer 103 and FIG. 4 illustrating a top view of the spacer 103.

As illustrated, there is a plurality of indentations 117 which extend around the interior perimeter of spacer 103 proximate to the bottom surface 115. As described herein above, the indentations 117 are configured to receive therein a radial finger 135 of base 105, such that when the spacer 103 is placed over the neck 131 of base 105 in a particular alignment of the user choosing, the radial finger 135 will mate with or be inserted into the corresponding indentations 117 of the plurality of indentations. Further, subsequent to a user placing the spacer 103 over the neck 131 of base 105, the lid 101 can be secured to base 105 via threads 133. When the lid 101 has been rotated to completion, i.e. top surface 129 of base 105 engages with the upper inner surface 109 of lid 101, lid 101 prevents the removal of spacer 103 from base 105, while the mating of finder 135 and indentation 117 prevent the rotation of spacer 103 about the neck 131 of base 105.

Figure 5:
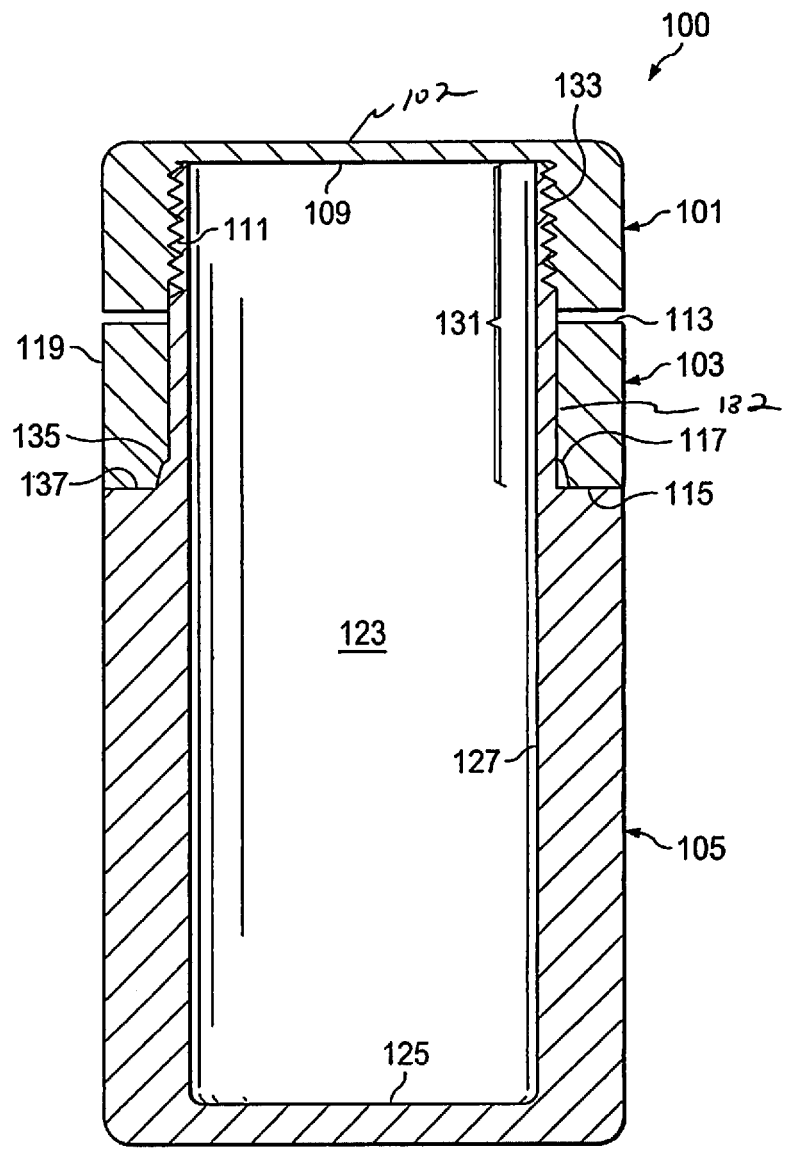
FIG. 5 illustrates a cross-sectional view of the time programmable container of the present invention.

Referring now to FIG. 5, there is illustrated a cross-sectional view of the time programmable container 100 with the spacer 103 placed over the neck 131 of base 105 and the lid 101 threaded onto base 105 with the top surface 129 of base 105 engaging the upper inner surface 109 of lid 101, this being the closed position of the present invention. Although illustrated with a small gap between the lid 101 and spacer 103, it is contemplated that no gap could be present, or if present, the gap would be small enough to prohibit sufficient movement of spacer 103 along neck 131 of base 105 and would maintain radial finger 135 in indentation 117, thereby preventing the rotation of spacer 103 around neck 131 of base 105.

Referring now to FIG. 6, there is illustrated the programmable time container 100 as similarly shown in FIGS. 1-5 in the closed position. As illustrated spacer 103 includes indicia of time 139 and a corresponding arrow or pointer 140. As illustrated in the exemplary embodiment, the indicia of time 139 are initials representing the days of the week. However, it is contemplated that the indicia of time 139 could be letters, number, symbols, shapes, colors or any combination thereof to give the user a reference of the selected indicia of time. As described above, in use, prior to placing spacer 103 onto base 105, the user will rotate spacer 103 until the selected indicia of time is in alignment with the pointer 140, here the W is in alignment with pointer 140. The spacer 103 is placed over neck 131 of base 105 until the corresponding finger 135 and indentation match up and mate, keeping the selected indicia of time 139 in alignment with pointer 140. Subsequent to the placement of spacer 103 onto base 105, lid 101 is then threaded upon base 105, thus securing any contents within base 105 and further preventing the rotation of spacer 103 about neck 131 of base 105.

Referring now to FIGS. 7-10, there is illustrated another embodiment of a time programmable container 700 in accordance with the principles of the present invention. As illustrated, time programmable container 700 includes a lid 101, base 105 and spacer 703. The spacer 703 includes a flange 704 which extends around the perimeter of spacer 703 and is configured to cooperate with the outer side surface of the base 105 when spacer 703 is placed upon base 105. Shoulder 137 of base 105 includes a plurality of upward extending projections 705 extending around the circumference of base 105 with the projections 705 being saw-toothed or serrated shaped upward projections. Similarly, spacer 703 includes a plurality of downward extending projections 707 with the projections 707 being saw-toothed or serrated shaped downward projections and are configured in size and shape to mate with projections 705. The downward extending projections 707 extend around the inner circumference of spacer 703 and from an intermediate surface 714, with the intermediate surface 714 being between or intermediate the top surface 713 of spacer 703 and the bottom surface 715 of spacer 703.

In operation, spacer 703 operates in a similar manner as spacer 103 described herein above. A user will place spacer 703 over the neck of base 105 and rotate spacer 703 about the neck of base 105 until a desired location or alignment of spacer 703 with respect to base 105 is achieved. Spacer 703 is then lowered onto base 105 such that projections 705 of base 105 mate with projections 707 of spacer 703. Subsequent thereto, lid 101 is threadably engaged with base 105 and rotated thereon. Once lid 101 is completely threaded onto base 105, the location of lid 101 will prevent the movement of spacer 703 off of the neck of base 105 and will, in addition to the engagement of projections 707 and 705, prevent the rotation of spacer 703 about base 105.

Figure 11:
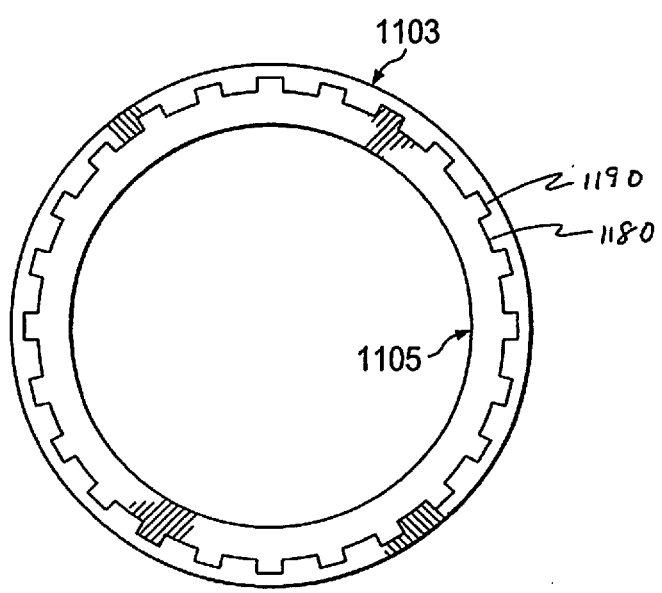
FIG. 11 illustrates a top view of an embodiment of a spacer of the present invention placed onto the neck of a container.
Figure 12:
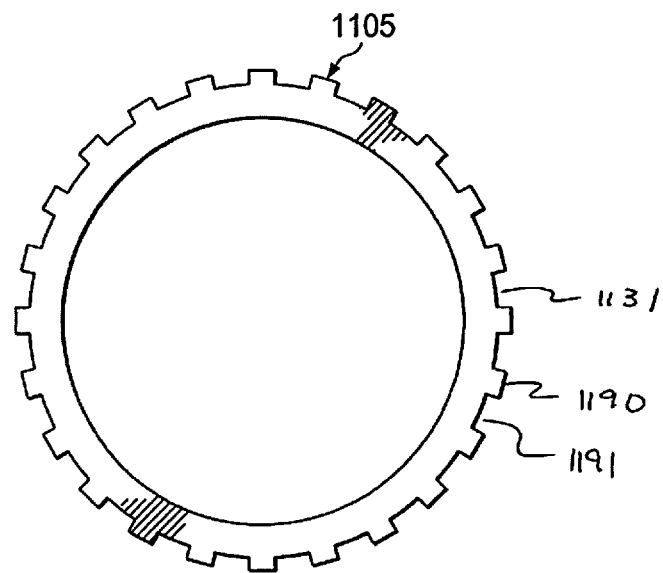
FIG. 12 illustrates a top view of an embodiment of a neck of the base of the present invention as similarly shown in FIG. 11.
Figure 13:
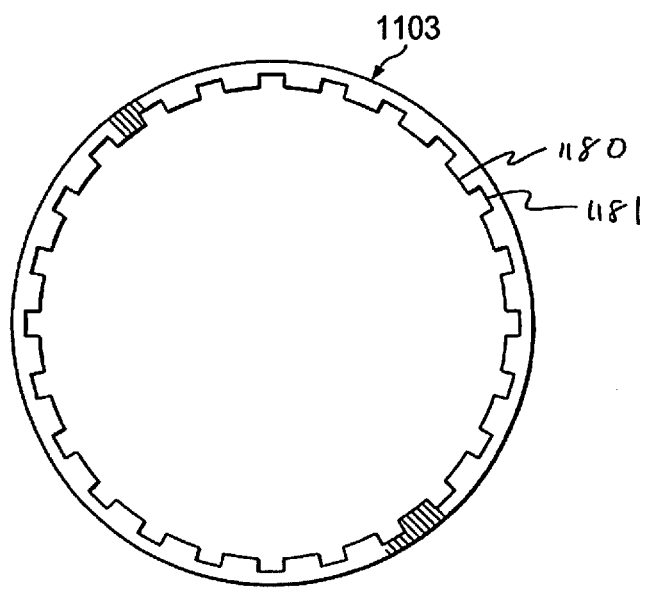
FIG. 13 illustrates a tope view of an embodiment of a spacer of the present invention as similarly shown in FIG. 11.

Referring now to FIGS. 11, 12 and 13, there is illustrated another embodiment of the present invention with FIG. 11 illustrating a top view of spacer 1103 placed upon base 1105 about neck 1131. As can be appreciated, base 1105 and spacer 1103 are similar to base 105 and spacer 1032 described herein above except that, as illustrated spacer 1103 includes a plurality of rectangular teeth 1180 that extend inward toward the center of spacer 1103 with a gap 1181 positioned between each of the plurality of teeth 1180, with teeth 1180 and gaps 1181 extending around the inner perimeter of spacer 1103. Similarly, base 1105 includes a plurality of rectangular teeth 1190 that extend outward from neck 1131 with a gap 1191 positioned between each of the plurality of teeth 1190, with teeth 1190 and gaps 1191 extending around the outer perimeter of neck 1131. As illustrated, teeth 1180 and 1190, and gaps 1181 and 1191 are sized to permit the mating of spacer 1103 upon base 1105 about neck 1131.

In operation, spacer 1103 operates in a similar manner as the spacers described herein above. A user will place spacer 1103 over the neck of base 1105 and rotate spacer 1103 about the neck of base 1105 until a desired location or alignment of spacer 1103 with respect to base 1105 is achieved. Spacer 1103 is then lowered onto base 1105 such that teeth 1190 of base 1105 mate with gaps 1181 of spacer 1103 and teeth 1180 of spacer 1103 mate with gaps 1191 of base 1105. Subsequent thereto, a lid (not shown) is threadably engaged with base 1105 and rotated thereon. Once lid is completely threaded onto base 1105, the location of lid will prevent the movement of spacer 1103 off of the neck of base 1105 and will, in addition to the engagement of the teeth 1180 with gaps 1191 and teeth 1190 with gaps 1182, prevent the rotation of spacer 1103 about base 1105.

Figure 14:
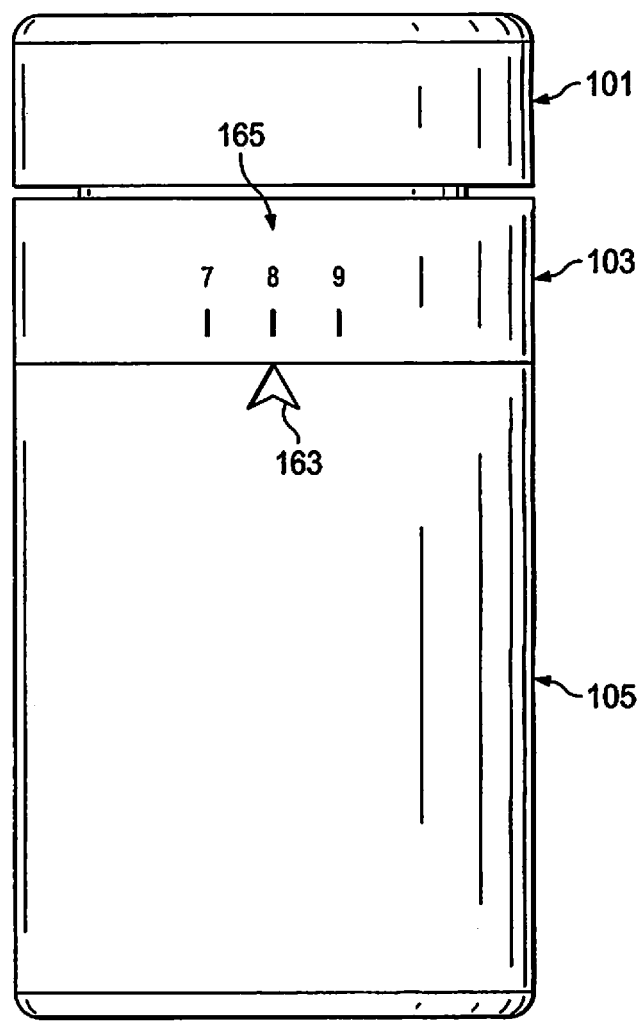
FIG. 14 illustrates a front view of an embodiment of a time programmable container of the present invention.

As illustrated in FIG. 14, the spacer 103 and base 105 include time indicia 165. The time indicia may correspond to various types of time indications, such as, but not limited to days of the week, and periods of time such as minutes, hours, days, weeks, months or years. These indicia may be utilized to indicate the period of time to associate with the articles or liquids within the central storage region 123. Additionally, an arrow or pointer 163 can be placed on the base 105 and used to cooperate with any of the selected time indicia by the user selecting a desired time indicia 165 and aligning the selected indicia 165 with arrow 163.

Figure 15:
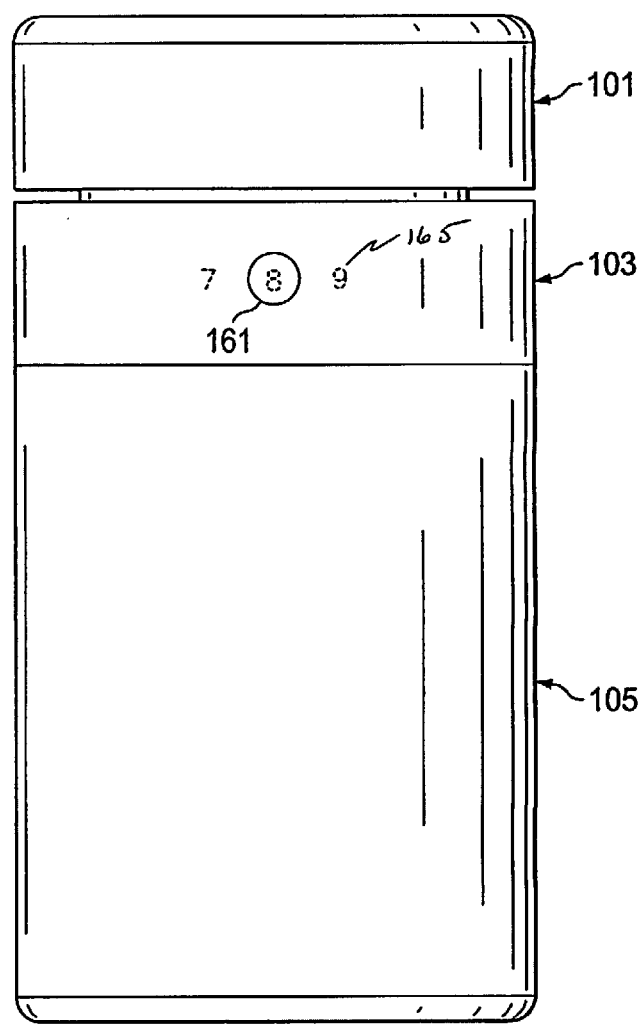
FIG. 15 illustrates a front view on an embodiment of a time programmable container of the present invention.

As illustrated in FIG. 15, the spacer 103 and base 105 include time indicia 165. The time indicia may correspond to various types of time indications, such as, but not limited to days of the week, and periods of time such as minutes, hours, days, weeks, months or years. These indicia may be utilized to indicate the period of time to associate with the articles or liquids within the central storage region 123. In this embodiment, the time indicia 165 are on neck 131 of base 105. Spacer 103 includes a target ring 161 or gap that is aligned over the selected time indicia to be displayed.

Referring now to FIGS. 16-20, there is illustrated an alternative embodiment of a time programmable container 100 as similarly illustrated in FIGS. 1-6 and having device or mechanism that inhibits the removal of the cap or lid 101 from the base 105 and spacer 103.

As illustrated in FIGS. 16-20, time programmable container 100 includes a lid 101, a spacer 103 and a base 105. Lid 101 is used to seal the time programmable container 100. Spacer 103 cooperates with the lid 101 and base 105 and is used to provide an indication of time (see for example FIGS. 6, 14 and 24), which may be selected or programmed from a plurality of indications. Base 105 is configured with a storage region 123 and is used to contain time sensitive material such as solids, liquids, medicines, food and other appropriate materials.

Spacer 103 and the corresponding time indicia may be programmed to indicate various properties of the materials contained within base 105, such as but not limited to: the time that the container was filled; the last time the container was either opened or closed; an expiration time for the materials stored therein. As can be appreciated the materials from which the elements of time programmable container 100 can be any of a number of rigid and flexible materials, such as, but not limited to various plastics, glass, and metals, or other appropriate material. Although, the time programmable container 100 is illustrated as an elongated cylinder, it is contemplated that other shapes such as rectangle, oval or other shapes and combinations of shapes could be used.

The lid 101 includes an upper exterior surface 102 which is in a spaced relationship with the upper interior surface 109. Upper interior surface 109 extends to the side interior surface 111. Side interior surface 111 extends around the inner periphery of the lid 101. The side interior surface 111 is a threaded surface and used to mate with threads 133 of base 105. A lip or rim 170 circumscribes the bottom portion of the outer perimeter of lid 101. Rim 170 includes a cavities 172 on the bottom portion of rim 170 and is configured in shape and size to receive therein, tab 182 of spacer 103. The shape and configuration of each of the cavities 172 ensures the receipt therein of locking tab 182 when lid 101 is secured onto base 105 regardless of the initial alignment of spacer 103 with respect to base 105.

The spacer 103 is ringed shaped and includes a central aperture which extends through the spacer 103. The spacer 103 includes a top surface 113 which extends around the periphery of the spacer 103. The top surface 113 is intermediate and connects to the exterior surface 119 and the interior surface 121 of spacer 103. The exterior surface 119 and the interior surface 121 define a bottom surface 115. Bottom surface 115 includes a plurality of depressions or indentations 117 which extend around the interior surface 121 and bottom surface 115. It is contemplated that the number of depressions 117 utilized will depend upon the number plurality of alignments for spacer 103 as desired by the user.

The spacer 103 includes a rigid lip or rim 180 that circumscribes a portion of the top portion of the outer perimeter of spacer 103 (see FIG. 18) and extends between the ends 180*a* and 180*b* of rim 180. Spacer 103 further includes a flexible tab 184 that connects between ends 180*a* and 180*b* of rim 180. Intermediate the two ends of flexile tab 184 is a locking tab 182. Locking tab 182 is a curved, elongated tab that is connected at one end thereof to flexible tab 184. Locking tab 182 is connected to flexible tab 184 in a manner that permits locking tab 182 to move in an up and down motion but is normally biased in a upwardly extending position with a portion of the end of locking tab 182 extending above the upper surfaces of flexible tab 184 and rim 180.

As illustrated, the base 105 is an elongated cylinder having a central storage region 123 to hold articles or liquids. The storage region 123 is defined by a base inner bottom surface 125 and a base inner side surface 127 which extends around the periphery of the base 105. The base 105 includes a base top surface 129 which extends around the periphery of the base 105 and cooperates with the upper inner surface 109 of lid 101 to form a seal. The base 105 includes a neck portion 131 which extends around the periphery of the base 105 and includes a threaded portion 133 which are configured to cooperate or mate with the threads of the side interior surface 111 of lid 101. The neck portion 131 also includes an unthreaded portion 132 which is configured to slidably engage the spacer 103. A shoulder 137 extends around the periphery of base 105 and is located at the bottom portion of the neck portion 131 opposite top surface 129.

The base 105 further includes a radial finger 135 which extends from the shoulder 137 and up neck portion 131 into the unthreaded portion 132. The radial finger 135 and depressions 117 are configured such that only one finger 135 can cooperate with a single depression 117 at a time of the plurality of depressions so that when the spacer 103 is placed over the neck 131 and onto the shoulder 137, the radial finger 135 will be positioned within a single depression 117, such that when the lid 101 is threadably engaged with the base 105 and the interior surface 109 of lid 101 is engaging top surface 129 of base 105, the finger 135 is inserted into and engaged with depression 117 and will prevent the spacer 103 from rotating about base 105.

Figure 20:
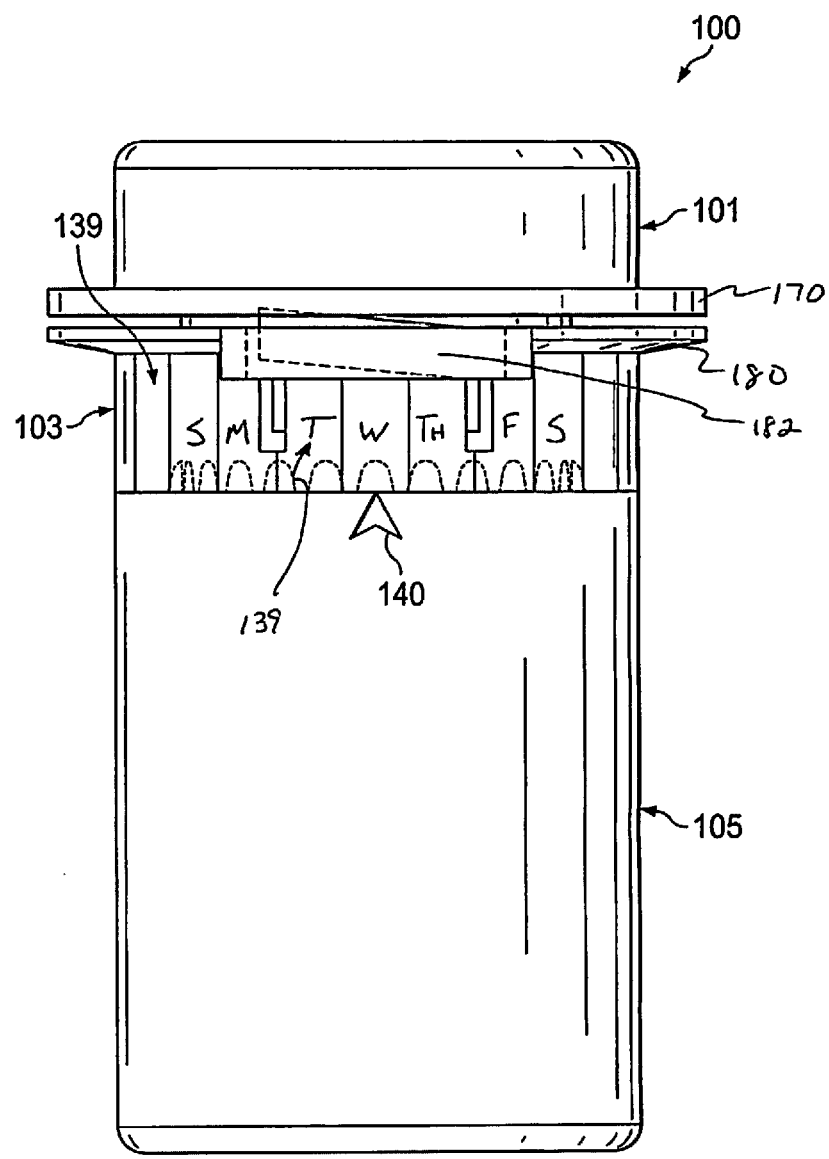
FIG. 20 illustrates a front view of an embodiment of a time programmable container as similarly shown in FIG. 6 with a device to inhibit the opening of the cap.

As illustrated in FIG. 20, the spacer 103 and base 105 include time indicia 139. The time indicia 139 may correspond to various types of time indications, such as, but not limited to days of the week, and periods of time such as minutes, hours, days, weeks, months or years. These indicia may be utilized to indicate the period of time to associate with the articles or liquids within the central storage region 123. Additionally, an arrow or pointer 140 can be placed on the base 105 and used to cooperate with any of the used time indicia 139.

In operation, a user will identify a desired time indicator on spacer 103. With the lid 101 and spacer 103 removed from base, the user will take spacer 103 and start to place it over the neck 131. Prior to the radial finger 135 engaging any of the depressions 117, the user will rotate the spacer 103 clockwise or counterclockwise, sequentially or non-sequentially about the neck 131 of the base 105 until the desired time indicator is in alignment with the arrow 140. Upon alignment, the user will then proceed to slide spacer 103 over the neck 131 until the bottom surface 115 engages shoulder 137 and finger 135 is inserted into a corresponding aligned indentation 117. Subsequent to the placement of the spacer 103 onto the shoulder 137, the user places the lid 101 onto the top of neck 131 such that the threads of interior surface 111 engage with the threads of threaded portion 133.

The user then rotates the lid 101 down onto the neck 131 until the upper surface 129 of base 105 engages upper surface 109 of lid 101. As the lid 101 is being rotated down neck 131 of base 105 and approaches spacer 103, a portion of the end of locking tab 182 will extend upward into a cavity 172 as the cavity 172 passes over locking tab 182. Locking tab 182 will flex downward as lid 101 is rotated and locking tab 182 exits cavity 172. As described above, the number, size and shape of cavity 172 is such that regardless of the orientation of spacer 103 with respect to 105, when the upper surface 129 of base 105 engages the upper surface 109 of lid 101, at least a portion of the end of locking tab 182 will extend into a cavity 172 of lid 101. Locking tab 182 is configured to permit the rotation of lid 101 in only one direction when locking tab 182 extends into a cavity 172 and prevents the rotation of lid 101 in the opposite direction.

When positioned as such, the lid 101 is positioned close to or proximate with or even engaged with, the spacer 103 so as to prevent the spacer 103 from moving in an upward motion along neck 131. Additionally, when the lid is in such position, the finger 135 is engaged with indentation 117, this locks and prevents the rotation of spacer 103 about the neck 131 of base 105. Once spacer 103 is placed onto shoulder 137, the arrow 140 will be in alignment with the selected time indicator. (See for example FIG. 20).

In order to remove spacer 103 and lid 101 from base 105, the user will depress flexible tab 184 in a downward motion. This motion removes locking tab 182 from engaged cavity 172. Maintaining the downward depression of flexible tab 184, the lid 101 can then be rotated in a direction opposite from the installation of lid 101 onto base 105 as described above. When the lid 101 has been sufficiently rotated such that the cavity 172 and the locking tab 182 cannot further engage when the locking tab 182 is in the normal biased position, the user may release the depression of flexible tab 184 and continue rotating lid 101 until removed from base 105.

Figure 16:
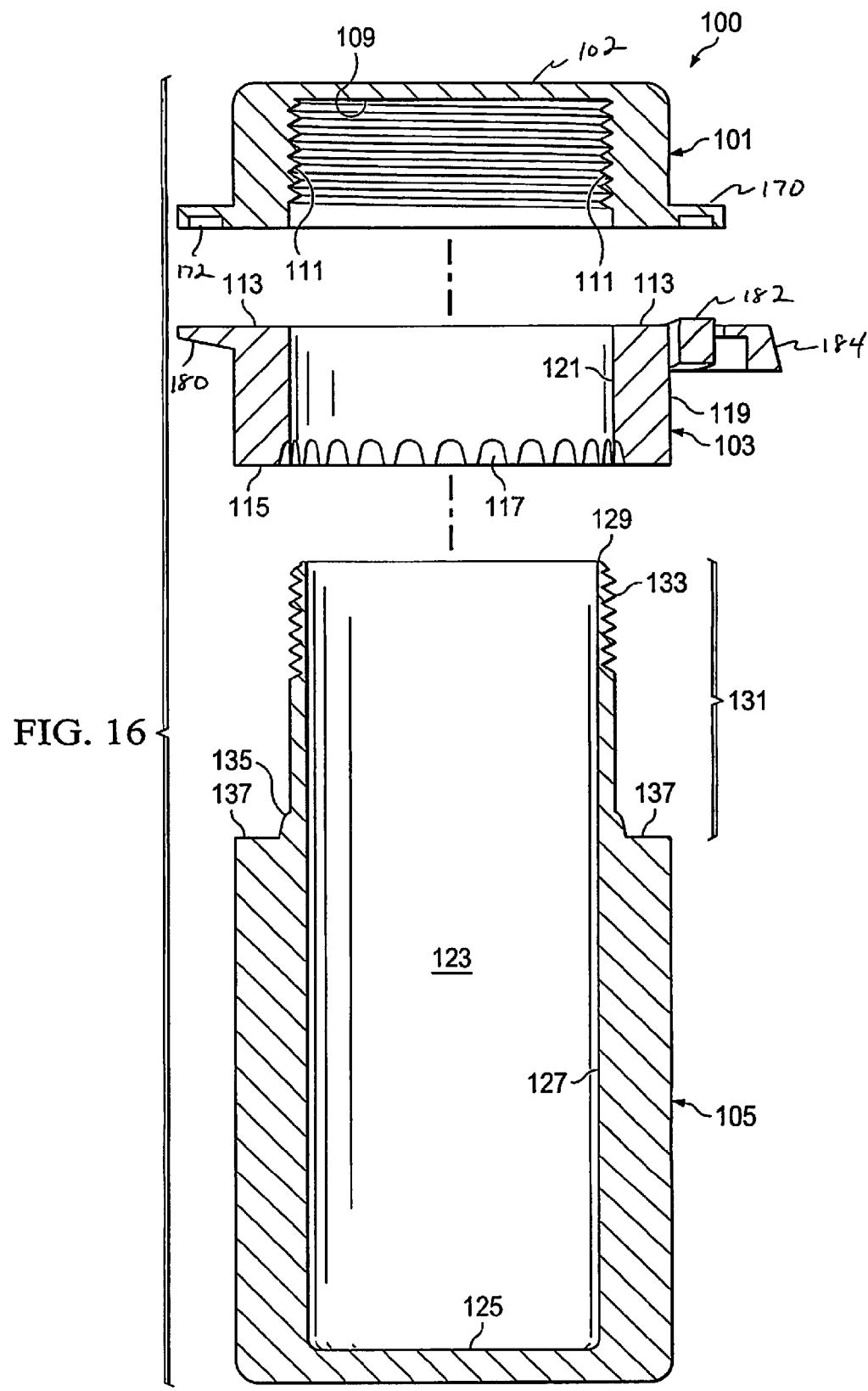
FIG. 16 illustrates an exploded cross-sectional view of an embodiment of a time programmable container as similarly shown in FIG. 1 with a device to inhibit the opening of the cap.
Figure 17:
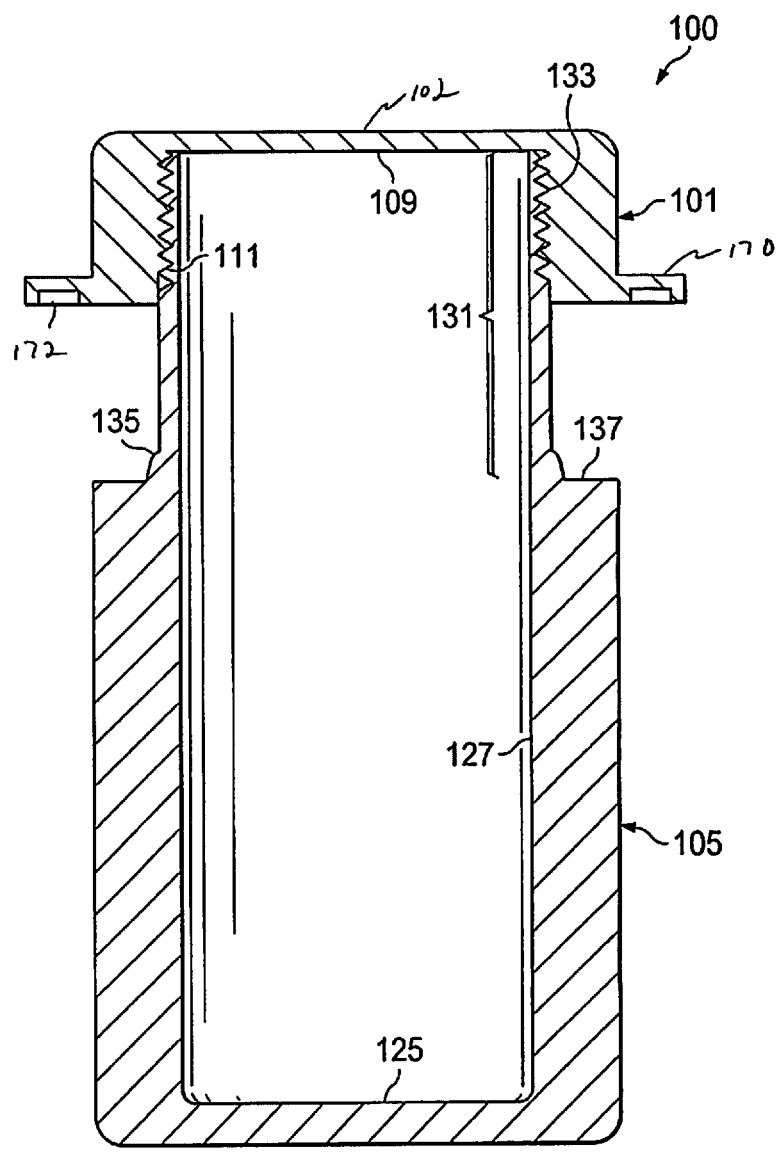
FIG. 17 illustrates a cross-sectional view of an embodiment of a time programmable container as similarly shown in FIG. 16 without the spacer device.

Referring now in particular to FIG. 17, there is illustrated the programmable container 100 as illustrated in FIG. 16 with the spacer 103 removed and the lid 101 secured to base 105. As described with reference to FIG. 16, time programmable container 100 includes a lid 101 and a base 105. Lid 101 is used to seal the time programmable container 100. Base 105 is configured with a storage region 123 and is used to contain time sensitive material such as solids, liquids, medicines, food and other appropriate materials.

The lid 101 includes an upper exterior surface 102 which is in a spaced relationship with the upper interior surface 109. Upper interior surface 109 extends to the side interior surface 111. Side interior surface 111 extends around the inner periphery of the lid 101. The side interior surface 111 is a threaded surface and used to mate with threads 133 of base 105.

As illustrated, the base 105 is an elongated cylinder having a central storage region 123 to hold articles or liquids. The storage region 123 is defined by a base inner bottom surface 125 and a base inner side surface 127 which extends around the periphery of the base 105. The base 105 includes a base top surface 129 which extends around the periphery of the base 105 and cooperates with the upper inner surface 109 of lid 101 to form a seal. The base 105 includes a neck portion 131 which extends around the periphery of the base 105 and includes a threaded portion 133 which are configured to cooperate or mate with the threads of the side interior surface 111 of lid 101. The neck portion 131 also includes an unthreaded portion 132 which is configured to slidably engage the spacer 103. A shoulder 137 extends around the periphery of base 105 and is located at the bottom portion of the neck portion 131 opposite top surface 129. The base 105 further includes a radial finger 135 which extends from the shoulder 137 and up neck portion 131 into the unthreaded portion 132.

Figure 18:
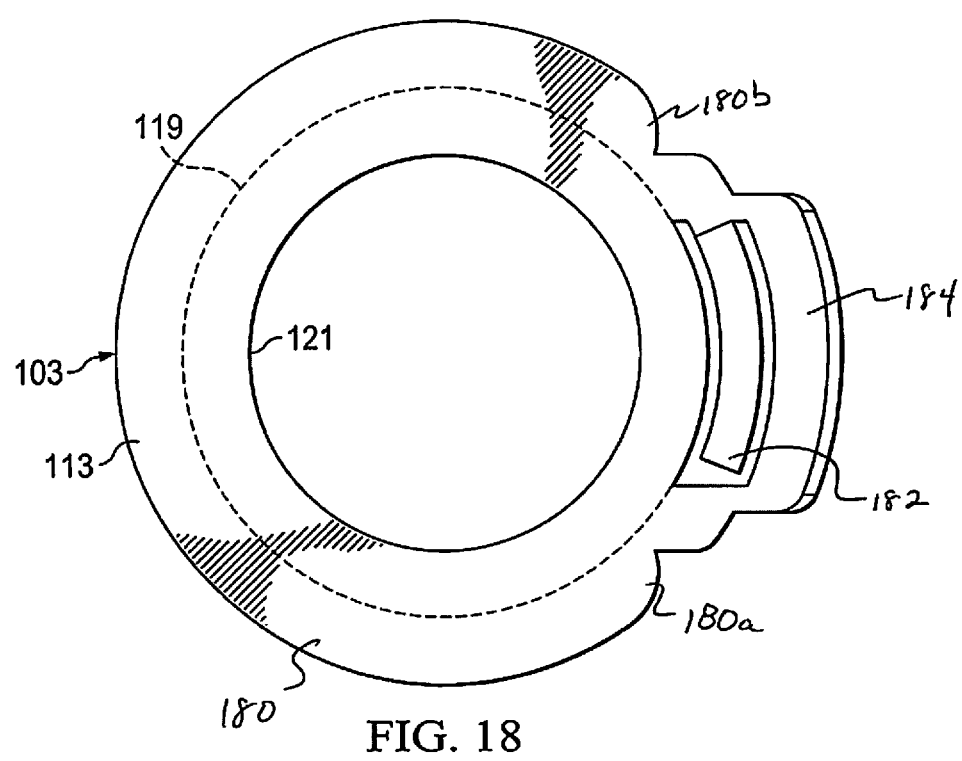
FIG. 18 illustrates a top view of the cap of the embodiment as similarly shown in FIGS. 17 and 18.

Referring now to FIG. 18, there is illustrated more detailed top view of the spacer 103. As illustrated, locking tab 182 is attached at one end to flexible tab 184. Flexible tab 184 is positioned between ends 180a and 180b of rim 180.

Figure 19:
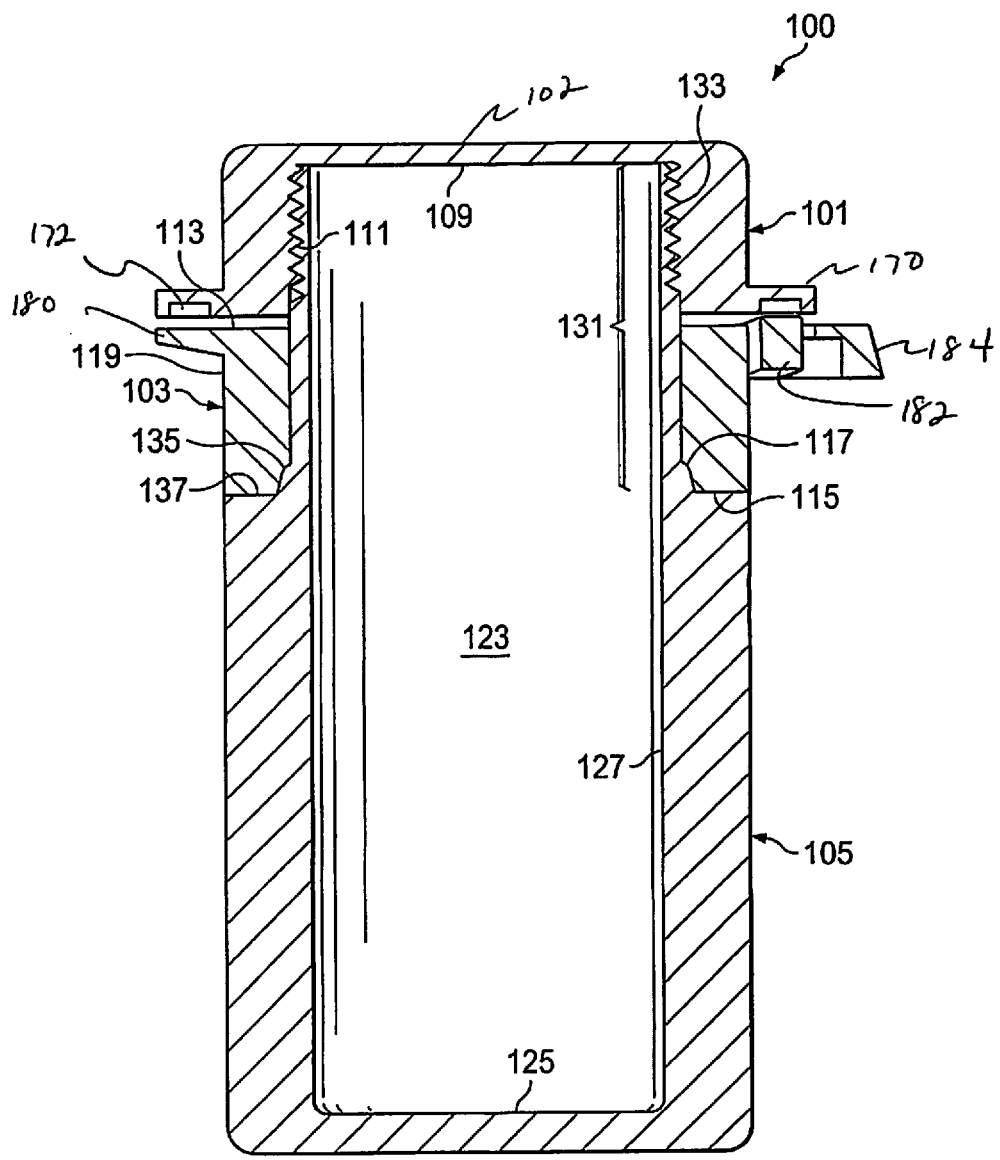
FIG. 19 illustrates a cross-sectional view of an embodiment of a time programmable container as similarly shown in FIGS. 16-18.

Referring now to FIG. 19, there is illustrated a cross-sectional view of the time programmable container 100 with the spacer 103 placed over the neck 131 of base 105 and the lid 101 threaded onto base 105 with the top surface 129 of base 105 engaging the upper inner surface 109 of lid 101, this being the closed position of the present invention. Although illustrated with a small gap between the lid 101 and spacer 103, it is contemplated that no gap could be present, or if present, the gap would be small enough to prohibit sufficient movement of spacer 103 along neck 131 of base 105 and would maintain radial finger 135 in indentation 117, thereby preventing the rotation of spacer 103 around neck 131 of base 105.

Referring now to FIG. 20, there is illustrated the programmable time container 100 as similarly shown in FIGS. 16-19 in the closed and locked position. As illustrated spacer 103 includes indicia of time 139 and a corresponding arrow or pointer 140. In the exemplary embodiment, the indicia of time 139 are initials representing the days of the week. However, it is contemplated that the indicia of time 139 could be letters, number, symbols, shapes, colors or any combination thereof to give the user a reference of the selected indicia of time. As described above, in use, prior to placing spacer 103 onto base 105, the user will rotate spacer 103 until the selected indicia of time is in alignment with the pointer 140, here the W is in alignment with pointer 140. The spacer 103 is placed over neck 131 of base 105 until the corresponding finger 135 and indentation match up and mate, keeping the selected indicia of time 139 in alignment with pointer 140. Subsequent to the placement of spacer 103 onto base 105, lid 101 is then threaded upon base 105 and when complete a portion of the end of locking tab 182 extends upward into one of the cavities 172 of lid 101, thus securing any contents within base 105 and further preventing the rotation of spacer 103 about neck 131 of base 105 and further locking lid 101 onto base 105.

Figure 21:
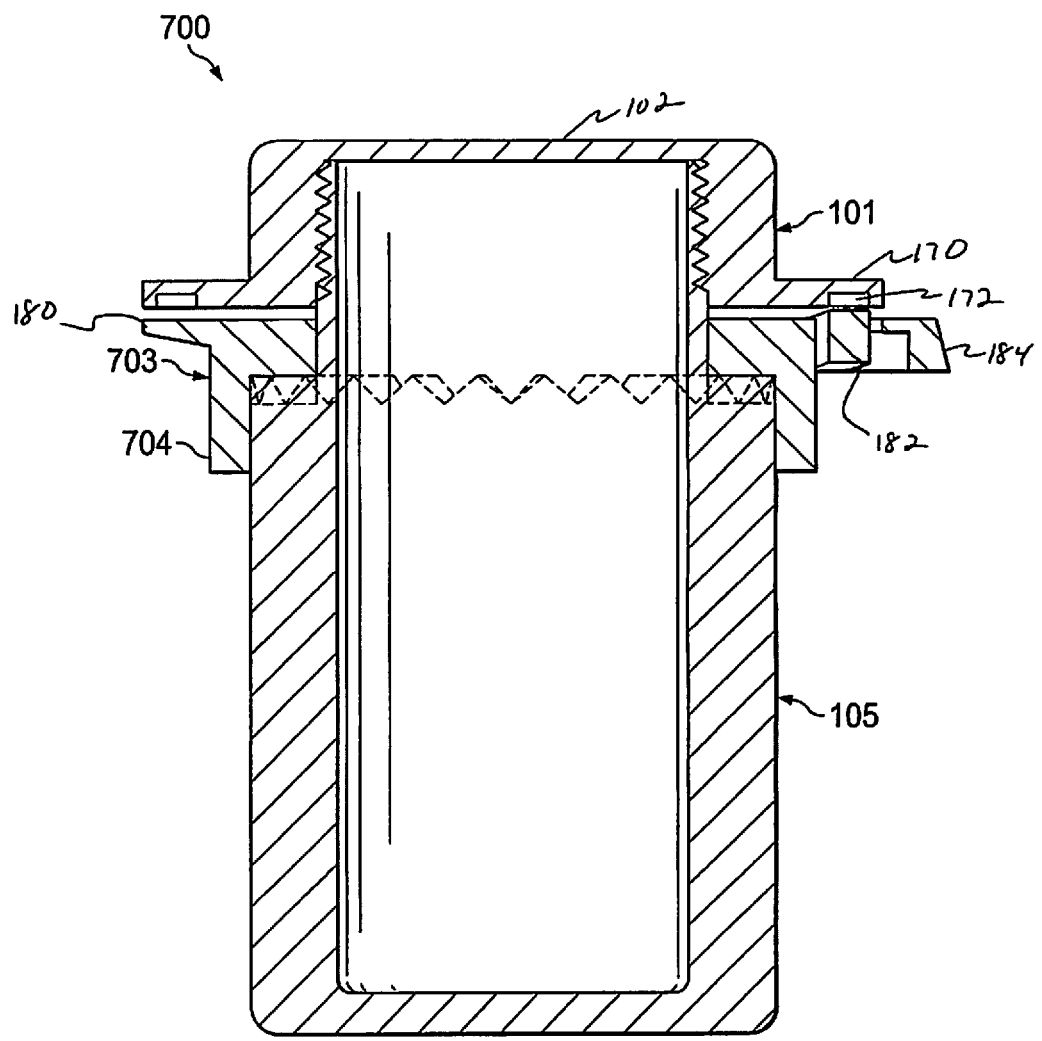
FIG. 21 illustrates a cross-sectional view of another embodiment of a time programmable container as similarly shown in FIG. 7 with a device to inhibit the opening of the cap.
Figure 22:
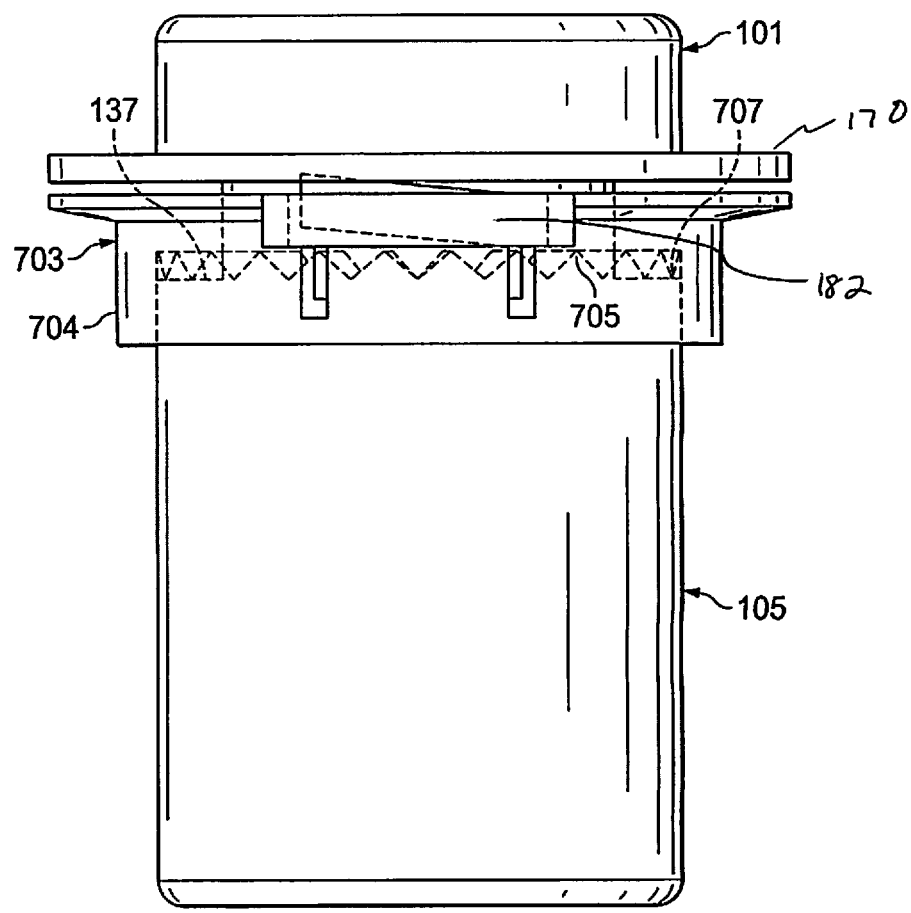
FIG. 22 illustrates a front view of an embodiment of a time programmable container as similarly shown in FIG. 21.

Referring now to FIGS. 21 and 22, there is illustrated another embodiment of a time programmable container 700 in accordance with the principles of the present invention. As illustrated, time programmable container 700 includes a lid 101, base 105 and spacer 703. The spacer 703 includes a flange 704 which extends around the perimeter of spacer 703 and is configured to cooperate with the outer side surface of the base 105 when spacer 703 is placed upon base 105. Shoulder 137 of base 105 includes a plurality of upward extending projections 705 extending around the circumference of base 105 with the projections 705 being saw-toothed or serrated shaped upward projections. Similarly, spacer 703 includes a plurality of downward extending projections 707 with the projections 707 being saw-toothed or serrated shaped downward projections and are configured in size and shape to mate with projections 705. The downward extending projections 707 extend around the inner circumference of spacer 703 and from an intermediate surface 714, with the intermediate surface 714 being between or intermediate the top surface 713 of spacer 703 and the bottom surface 715 of spacer 703.

In operation, spacer 703 operates in a similar manner as spacer 103 described herein above. A user will place spacer 703 over the neck of base 105 and rotate spacer 703 about the neck of base 105 until a desired location or alignment of spacer 703 with respect to base 105 is achieved. Spacer 703 is then lowered onto base 105 such that projections 705 of base 105 mate with projections 707 of spacer 703.

Subsequent thereto, the user then rotates the lid 101 down onto the neck 131 until the upper surface 129 of base 105 engages upper surface 109 of lid 101. As the lid 101 is being rotated down neck 131 of base 105 and approaches spacer 703, a portion of the end of locking tab 182 will extend upward into one of a plurality of cavities 172 as the cavities 172 pass over locking tab 182. Locking tab 182 will flex downward as lid 101 is rotated and locking tab 182 exits cavities 172. As described above, the number, size and shape of cavities 172 is such, that regardless of the orientation of spacer 703 with respect to 105, when the upper surface 129 of base 105 engages the upper surface 109 of lid 101, at least a portion of the end of locking tab 182 will extend into one of a cavity 172 of lid 101. Locking tab 182 is configured to permit the rotation of lid 101 in only one direction when locking tab 182 extends into cavity 172 and prevents the rotation of lid 101 in the opposite direction.

When the lid 101 is positioned close to or proximate with or even engaged with the spacer 703, spacer 703 is prevented from moving in an upward motion along neck 131. Additionally, when the lid is completely threaded onto base 105, the location of lid 101 will prevent the movement of spacer 703 off of the neck of base 105 and along with the engagement of projections 707 and 705, will prevent the rotation of spacer 703 about base 105.

In order to remove spacer 703 and lid 101 from base 105, the user will depress flexible tab 184 in a downward motion. This motion removes locking tab 182 from engaged cavity 172. Maintaining the downward depression of flexible tab 184, the lid 101 can then be rotated in a direction opposite from the installation of lid 101 onto base 105 as described above. When the lid 101 has been sufficiently rotated such that the cavity 172 and the locking tab 182 cannot further engage when the locking tab 182 is in the normal biased position, the user may release the depression of flexible tab 184 and continue rotating lid 101 until removed from base 105.

Referring now to FIGS. 24-30, there is illustrated another embodiment of a time programmable container 100 as similarly illustrated in FIGS. 16-20 and having device or mechanism that inhibits the removal of the cap or lid 101 from the base 105 and spacer 103.

As illustrated in FIGS. 24-30, time programmable container 100 includes a lid 101, a spacer 103 and a base 105. Lid 101 is used to seal the time programmable container 100. Spacer 103 cooperates with the lid 101 and base 105 and is used to provide an indication of time, which may be selected or programmed from a plurality of indications 165. Base 105 is configured with a storage region 123 and is used to contain time sensitive material such as solids, liquids, medicines, food and other appropriate materials.

Spacer 103 and the corresponding time indicia 165 may be programmed to indicate various properties of the materials contained within base 105, such as but not limited to: the time that the container was filled; the last time the container was either opened or closed; an expiration time for the materials stored therein. As can be appreciated the materials from which the elements of time programmable container 100 can be any of a number of rigid and flexible materials, such as, but not limited to various plastics, glass, and metals, or other appropriate material. Although, the time programmable container 100 is illustrated as an elongated cylinder, it is contemplated that other shapes such as rectangle, oval or other shapes and combinations of shapes could be used.

The lid 101 includes an upper exterior surface 102 which is in a spaced relationship with the upper interior surface 109. Upper interior surface 109 extends to the side interior surface 111. Side interior surface 111 extends around the inner periphery of the lid 101. The side interior surface 111 is a threaded surface and used to mate with threads 133 of base 105. A lip or rim 170 circumscribes the bottom portion of the outer perimeter of lid 101. Rim 170 includes a plurality of cavities 172 on the bottom portion of rim 170 and are spaced apart a determined distance, and are configured in shape and size to receive therein, tab 182 of spacer 103 (see FIGS. 27-29). The spacing and shape configuration of cavities 172 ensure the receipt therein of locking tab 182 when lid 101 is secured onto base 105 regardless of the user's alignment of spacer 103 with respect to base 105.

The spacer 103 is ringed shaped and includes a central aperture which extends through the spacer 103. The spacer 103 includes a top surface 113 which extends around the periphery of the spacer 103. The top surface 113 is intermediate and connects to the exterior surface 119 and the interior surface 121 of spacer 103. The exterior surface 119 and the interior surface 121 define a bottom surface 115. Bottom surface 115 includes a plurality of depressions or indentations 117 which extend around the interior surface 121 and bottom surface 115. It is contemplated that the number of depressions 117 utilized will depend upon the number plurality of alignments for spacer 103 as desired by the user.

The spacer 103 includes a rigid lip or rim 180 that circumscribes a portion of the top portion of the outer perimeter of spacer 103 and extends between the ends 180a and 180b of rim 180 (as shown and described in relation to FIG. 18). Spacer 103 further includes a flexible tab 184 that connects between ends 180a and 180b of rim 180. Intermediate the two ends of flexile tab 184 is a locking tab 182. Locking tab 182 is a curved, elongated tab that is connected at one end thereof to flexible tab 184. Locking tab 182 is connected to flexible tab 184 in a manner that permits locking tab 182 to move in an up and down motion but is normally biased in a upwardly extending position with a portion of the end of locking tab 182 extending above the upper surfaces of flexible tab 184 and rim 180.

As described herein above, the base 105 is an elongated cylinder having a central storage region 123 to hold articles or liquids. The storage region 123 is defined by a base inner bottom surface 125 and a base inner side surface 127 which extends around the periphery of the base 105. The base 105 includes a base top surface 129 which extends around the periphery of the base 105 and cooperates with the upper inner surface 109 of lid 101 to form a seal. The base 105 includes a neck portion 131 which extends around the periphery of the base 105 and includes a threaded portion 133 which are configured to cooperate or mate with the threads of the side interior surface 111 of lid 101. The neck portion 131 also includes an unthreaded portion 132 which is configured to slidably engage the spacer 103. A shoulder 137 extends around the periphery of base 105 and is located at the bottom portion of the neck portion 131 opposite top surface 129.

The base 105 further includes a radial finger 135 which extends from the shoulder 137 and up neck portion 131 into the unthreaded portion 132. The radial finger 135 and depressions 117 are configured such that only one finger 135 can cooperate with a single depression 117 at a time of the plurality of depressions so that when the spacer 103 is placed over the neck 131 and onto the shoulder 137, the radial finger 135 will be positioned within a single depression 117, such that when the lid 101 is threadably engaged with the base 105 and the interior surface 109 of lid 101 is engaging top surface 129 of base 105, the finger 135 is inserted into and engaged with depression 117 and will prevent the spacer 103 from rotating about base 105.

Figure 24:
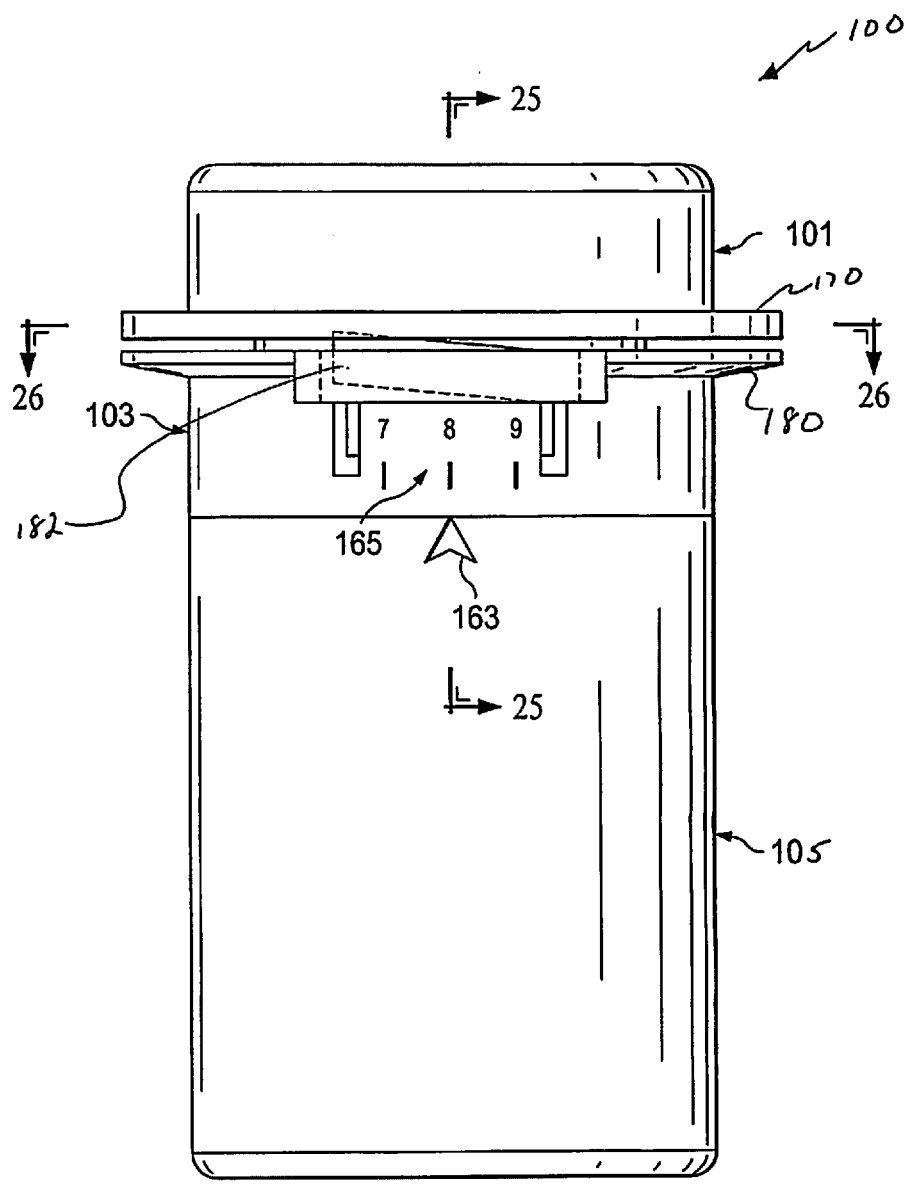
FIG. 24 illustrates a front view of an alternative embodiment of a time programmable container as similarly shown in FIG. 14 with a device to inhibit the opening of the cap.

As illustrated in FIG. 24, the spacer 103 includes time indicia 165. The time indicia 165 may correspond to various types of time indications, such as, but not limited to days of the week, and periods of time such as minutes, hours, days, weeks, months or years. These indicia may be utilized to indicate the period of time to associate with the articles or liquids within the central storage region 123. Additionally, an arrow or pointer 163 can be placed on the base 105 and used to cooperate with any of the used time indicia 165.

In operation, a user will identify a desired time indicator on spacer 103. With the lid 101 and spacer 103 removed from base, the user will take spacer 103 and start to place it over the neck 131. Prior to the radial finger 135 engaging any of the depressions 117, the user will rotate the spacer 103 about the neck 131 of the base 105 until the desired time indicator is in alignment with the arrow 163. Upon alignment, the user will then proceed to slide spacer 103 over the neck 131 until the bottom surface 115 engages shoulder 137 and finger 135 is inserted into a corresponding aligned indentation 117. Subsequent to the placement of the spacer 103 onto the shoulder 137, the user places the lid 101 onto the top of neck 131 such that the threads of interior surface 111 engage with the threads of threaded portion 133.

The user then rotates the lid 101 down onto the neck 131 until the upper surface 129 of base 105 engages upper surface 109 of lid 101. As the lid 101 is being rotated down neck 131 of base 105 and approaches spacer 103, a portion of the end of locking tab 182 will extend upward into one of the plurality of cavities 172 as the cavity 172 passes over locking tab 182. Locking tab 182 will flex downward as lid 101 is rotated and locking tab 182 exits from a particular cavity 172. As described above, the spacing, size and shape of each of the plurality of cavities 172 are such that regardless of the orientation of spacer 103 with respect to 105, when the upper surface 129 of base 105 engages the upper surface 109 of lid 101, at least a portion of the end of locking tab 182 will extend into one of the plurality of cavities 172 of lid 101. Locking tab 182 is configured to permit the rotation of lid 101 in only one direction. When locking tab 182 extends into one of the cavities 172, locking tab 182 prevents the rotation of lid 101 in one direction while permitting rotation in the opposite direction.

When positioned as such, the lid 101 is positioned close to or proximate with or even engaged with, the spacer 103 so as to prevent the spacer 103 from moving in an upward motion along neck 131. Additionally, when the lid is in such position, the finger 135 is engaged with indentation 117, this locks or prevents the rotation of spacer 103 about the neck 131 of base 105. Once spacer 103 is placed onto shoulder 137, the arrow 163 will be in alignment with the selected time indicator 165. (See FIG. 24).

In order to remove spacer 103 and lid 101 from base 105, the user will depress flexible tab 184 in a downward motion. This motion removes locking tab 182 from the engaged cavity 172. Maintaining the downward depression of flexible tab 184, the lid 101 can then be rotated in a direction opposite from the installation of lid 101 onto base 105 as described above. When the lid 101 has been sufficiently rotated such that the cavities 172 and the locking tab 182 cannot further engage when the locking tab 182 is in the normal biased position, the user may release the depression of flexible tab 184 and continue rotating lid 101 until removed from base 105.

Figure 25:
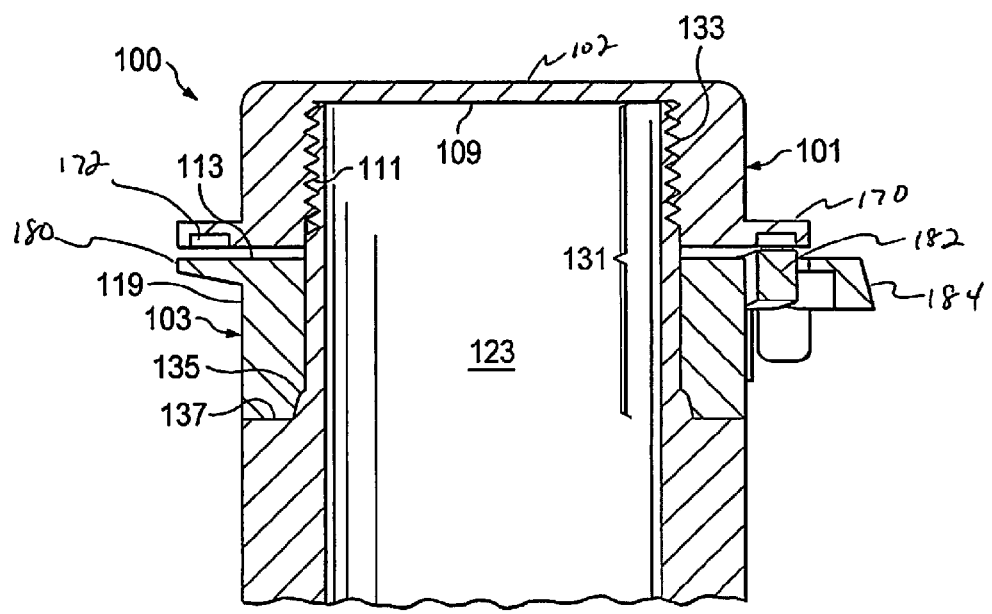
FIG. 25 illustrates a partial cross-sectional view of a time programmable container taken along line 25-25 of FIG. 24.

Referring now to FIG. 25, there is illustrated a partial cross-sectional view taken along line 25-25 of FIG. 24. Although illustrated with a small gap between the lid 101 and spacer 103, it is contemplated that no gap could be present, or if present, the gap would be small enough to prohibit sufficient movement of spacer 103 along neck 131 of base 105 and would maintain radial finger 135 in indentation 117, thereby preventing the rotation of spacer 103 around neck 131 of base 105.

Figure 26:
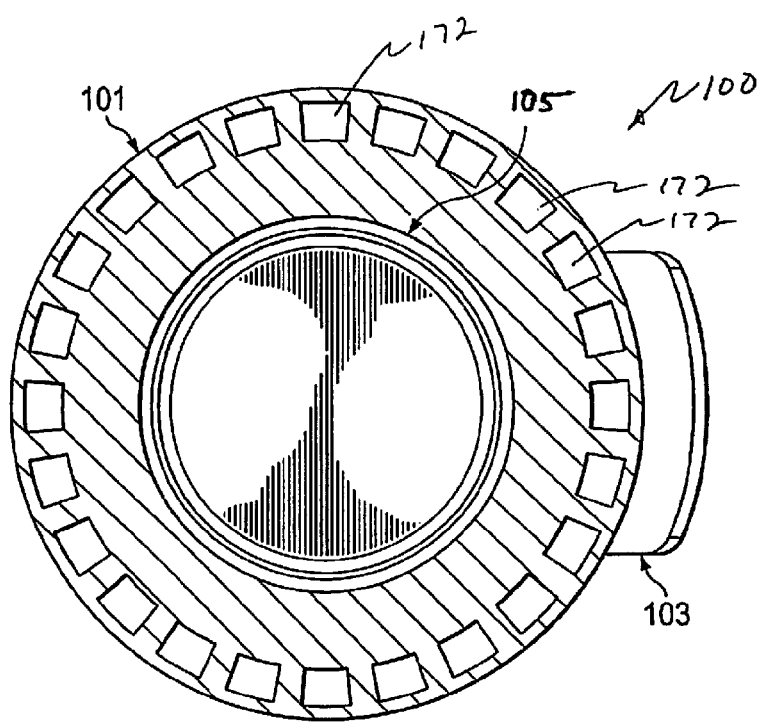
FIG. 26 illustrates a top cross-sectional view of the cap of the time programmable container taken along line 26-26 of FIG. 24.

Referring now to FIG. 26, there is illustrated a cross-sectional view taken along line 26-26 of FIG. 24 illustrating in more detail the plurality of cavities 172 of lid 101.

Figure 27:
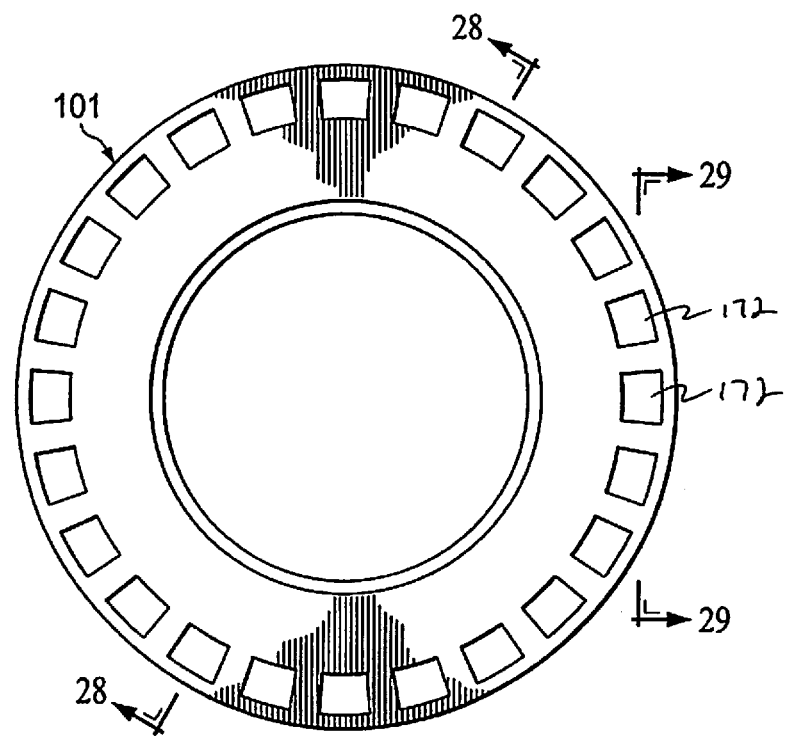
FIG. 27 illustrates a bottom view of the cap of the time programmable container as similarly shown in FIGS. 23-26.

Referring now to FIG. 27, there is illustrated a bottom view of lid 101 as similarly shown in FIG. 24, illustrating in more detail the plurality of cavities 172 circumventing the bottom surface of lip 170.

Figure 28:
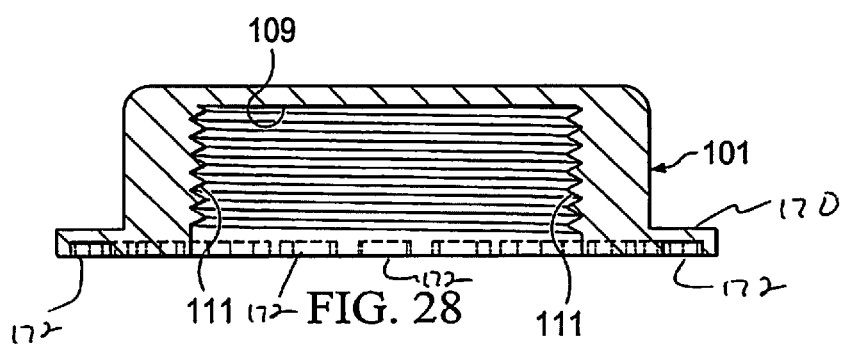
FIG. 28 illustrates a cross-sectional view of the cap of the time programmable container taken along line 28-28 of FIG. 27.
Figure 29:
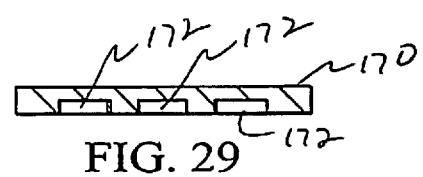
FIG. 29 illustrates a cross-sectional view of the cap of the time programmable container taken along line 29-29 of FIG. 27.

Referring now to FIG. 28, there is illustrated a cross-sectional view of lid 101 taken along line 28-28 of FIG. 27, while FIG. 29 illustrates a cross-sectional view of lid 101 taken along line 29-29 of FIG. 27.

Figure 30:
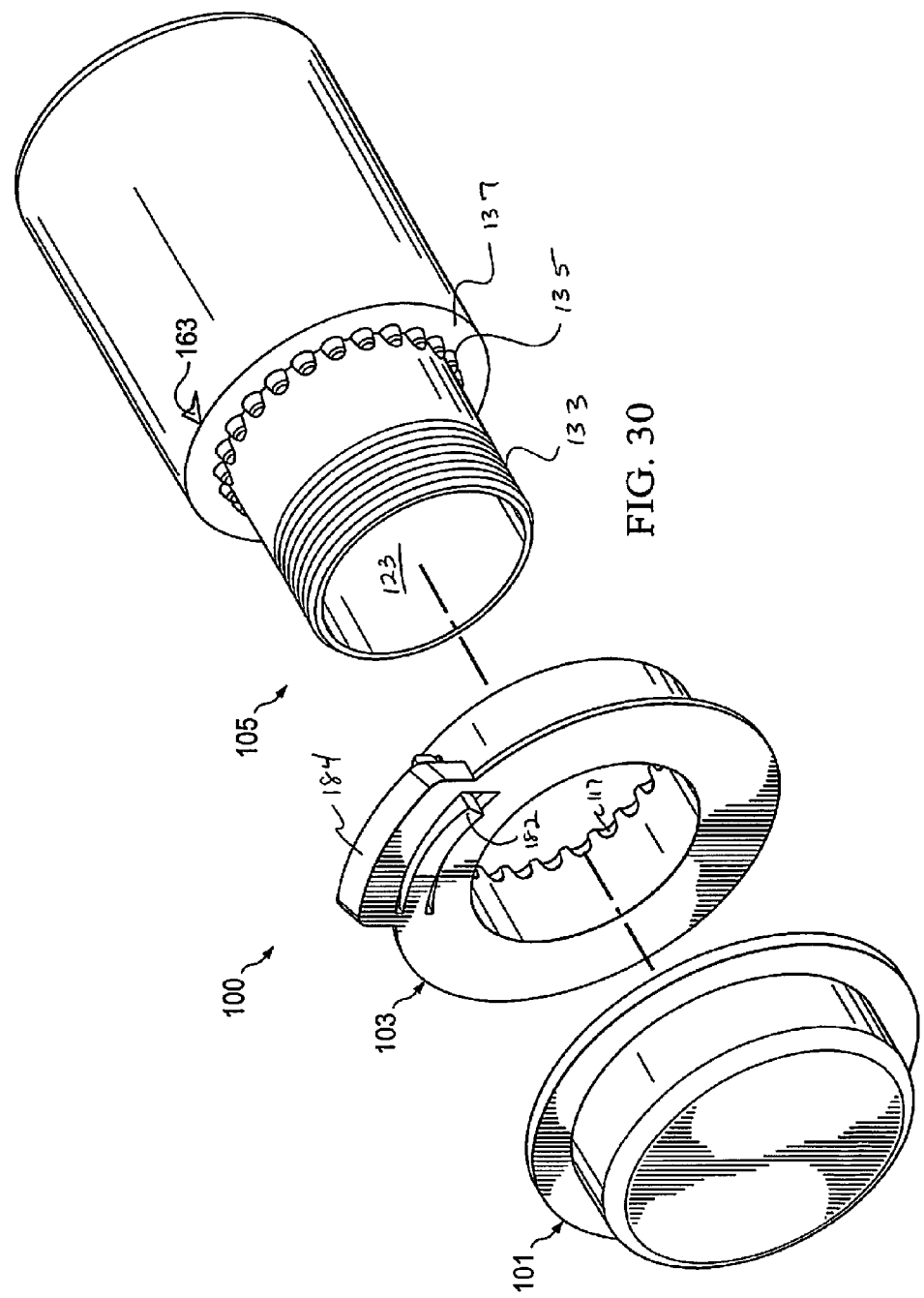
FIG. 30 illustrates an exploded perspective view of a time programmable container with a device for inhibiting the opening of the cap as similarly shown in FIG. 24.

Referring now to FIG. 30, there is illustrated an exploded perspective view of time programmable container 100 as similarly shown in FIG. 24.

Figure 23:
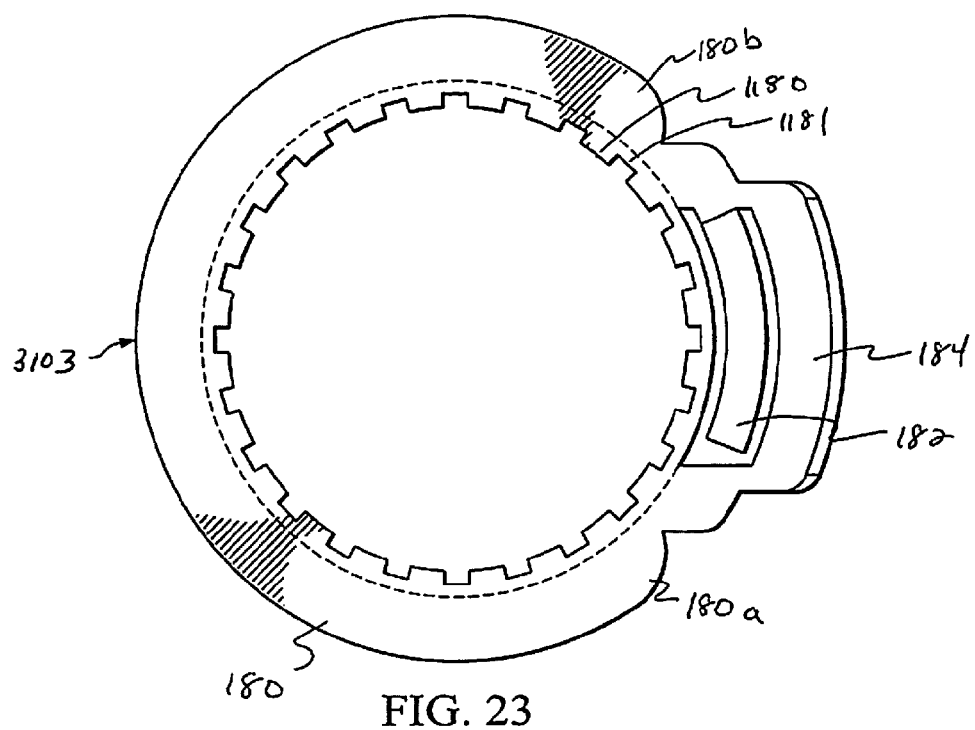
FIG. 23 illustrates a top view of a spacer for an alternative embodiment of a time programmable container with a device to inhibit the opening of the cap as similarly shown in FIG. 24.
Figure 31:
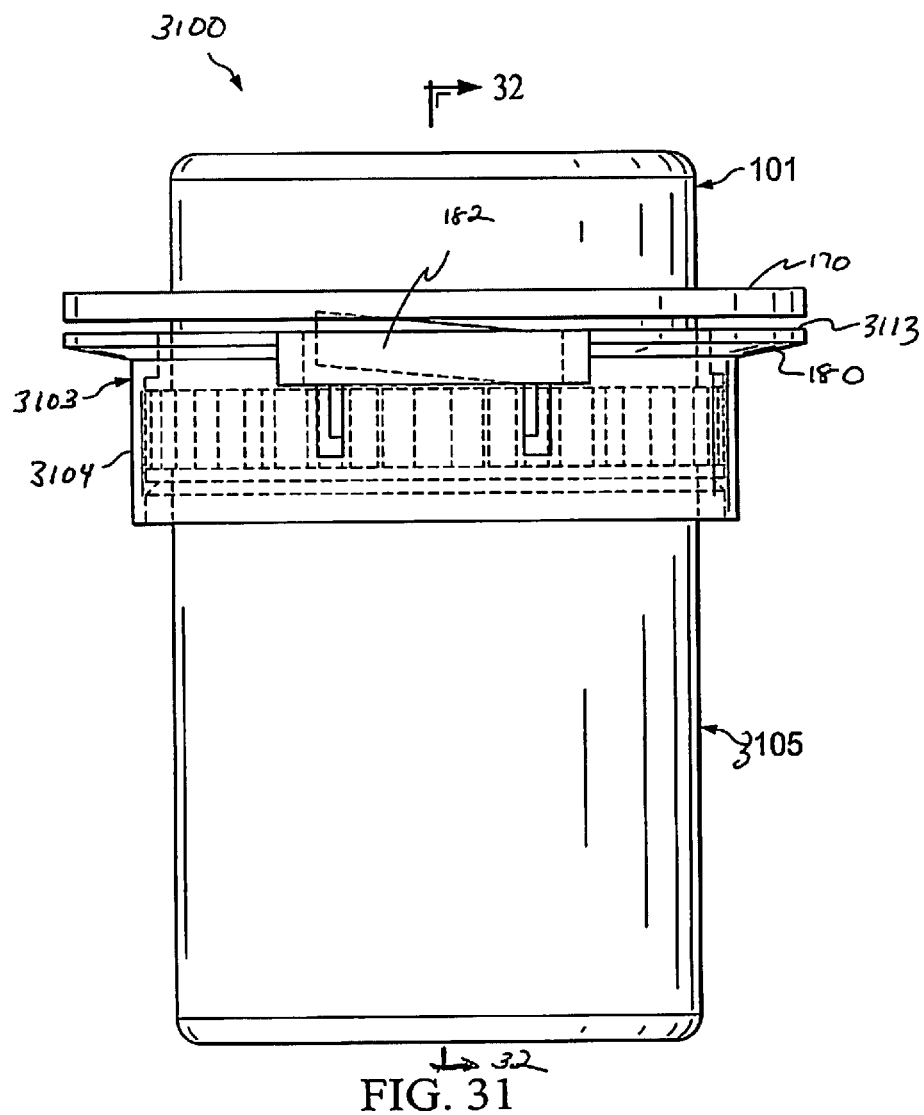
FIG. 31 illustrates a front view of yet another embodiment of a time programmable container with a device for inhibiting the opening of the cap.
Figure 32:
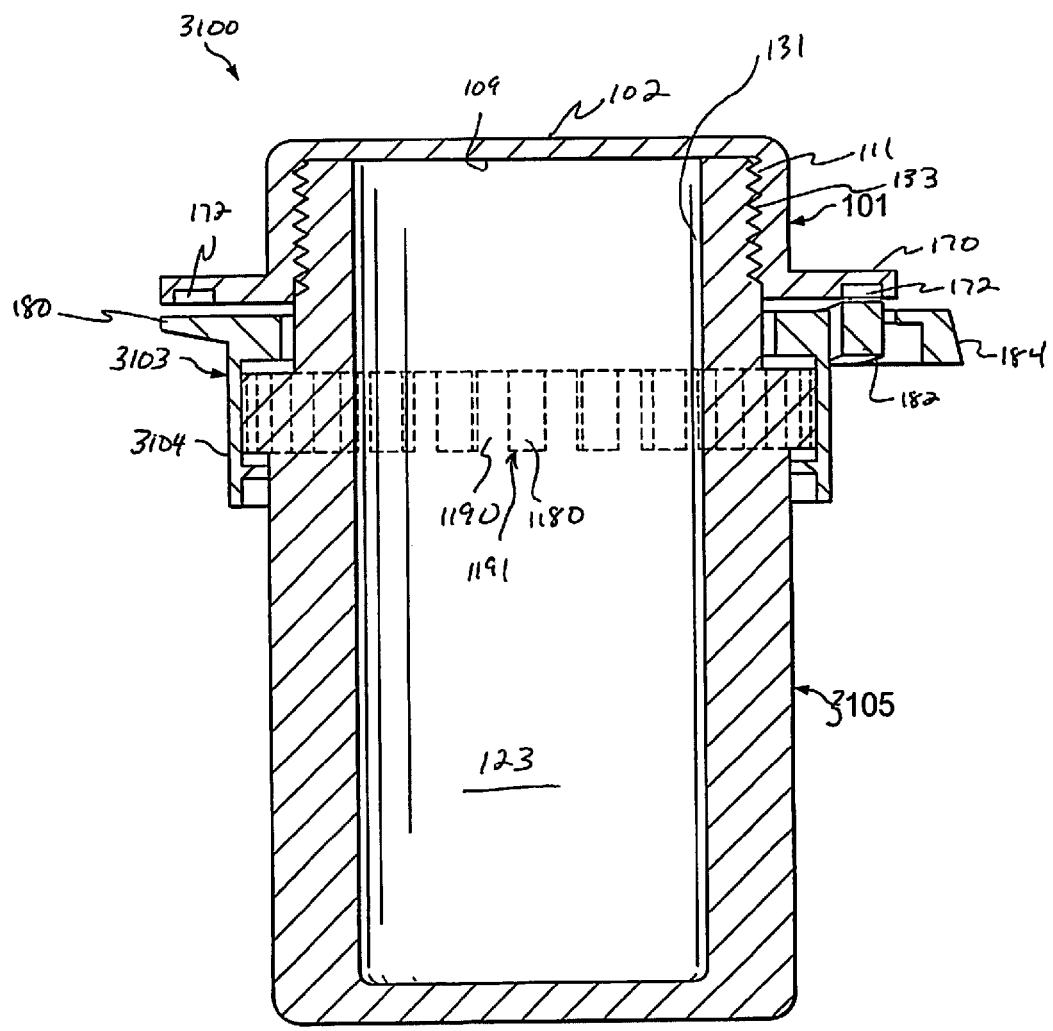
FIG. 32 illustrates a cross-sectional view of the cap of the time programmable container taken along line 32-32 of FIG. 31.

Referring now to FIGS. 31, 32 and 23, there is illustrated another embodiment of a time programmable container 3100 as similarly illustrated and described herein and having device or mechanism that inhibits the removal of the cap or lid 101 from the base 105 and spacer 103.

As illustrated in FIGS. 23, 31 and 32, time programmable container 3100 includes a lid 101, a spacer 3103 and a base 105. Lid 101 is used to seal the time programmable container 3100. Spacer 3103 cooperates with the lid 101 and base 105 and is used to provide an indication of time, which may be selected or programmed from a plurality of indications (as described herein above). Base 3105 is configured with a storage region 123 and is used to contain time sensitive material such as solids, liquids, medicines, food and other appropriate materials.

Although not illustrated, spacer 3103 may include time indicia as described herein above and may be programmed to indicate various properties of the materials contained within base 3105, such as but not limited to: the time that the container was filled; the last time the container was either opened or closed; an expiration time for the materials stored therein. As can be appreciated the materials from which the elements of time programmable container 3100 can be any of a number of rigid and flexible materials, such as, but not limited to various plastics, glass, and metals, or other appropriate material. Although, the time programmable container 3100 is illustrated as an elongated cylinder, it is contemplated that other shapes such as rectangle, oval or other shapes and combinations of shapes could be used.

The lid 101 includes an upper exterior surface 102 which is in a spaced relationship with the upper interior surface 109. Upper interior surface 109 extends to the side interior surface 111. Side interior surface 111 extends around the inner periphery of the lid 101. The side interior surface 111 is a threaded surface and used to mate with threads 133 of base 3105. A lip or rim 170 circumscribes the bottom portion of the outer perimeter of lid 101. Rim 170 includes a plurality of cavities 172 on the bottom portion of rim 170 and are spaced apart a determined distance, and are configured in shape and size to receive therein, tab 182 of spacer 3103. The spacing and shape configuration of cavities 172 ensure the receipt therein of locking tab 182 when lid 101 is secured onto base 3105 regardless of the user's alignment of spacer 3103 with respect to base 3105.

As can be appreciated, base 3105 and spacer 3103 are similar to base 105 and spacer 103 described herein above with respect to FIGS. 16-20 except that, as illustrated spacer 3103 includes a plurality of rectangular teeth 1180 that extend inward toward the center of spacer 3103 with a gap 1181 positioned between each of the plurality of teeth 1180, with teeth 1180 and gaps 1181 extending around the inner perimeter of spacer 3103. Similarly, base 3105 includes a plurality of rectangular teeth 1190 that extend outward from neck 1131 with a gap 1191 positioned between each of the plurality of teeth 1190, with teeth 1190 and gaps 1191 extending around the outer perimeter of neck 131. As illustrated, teeth 1180 and 1190, and gaps 1181 and 1191 are sized to permit the mating of spacer 3103 upon base 3105 about neck 131. The spacer 3103 further includes a flange 3104 which extends around the perimeter of the bottom portion of spacer 3103 and is configured to cooperate with the outer side surface of the base 3105 when spacer 3103 is placed upon base 3105.

The spacer 3103 includes a rigid lip or rim 180 that circumscribes a portion of the top portion of the outer perimeter of spacer 3103 and extends between the ends 180a and 180b of rim 180 (see FIG. 23). Spacer 3103 further includes a flexible tab 184 that connects between ends 180a and 180b of rim 180. Intermediate the two ends of flexile tab 184 is a locking tab 182. Locking tab 182 is a curved, elongated tab that is connected at one end thereof to flexible tab 184. Locking tab 182 is connected to flexible tab 184 in a manner that permits locking tab 182 to move in an up and down motion but is normally biased in a upwardly extending position with a portion of the end of locking tab 182 extending above the upper surfaces of flexible tab 184 and rim 180.

In operation, spacer 3103 operates in a similar manner as the spacers described herein above. A user will place spacer 3103 over the neck of base 3105 and rotate spacer 3103 about the neck of base 3105 until a desired location or alignment of spacer 3103 with respect to base 3105 is achieved. Spacer 3103 is then lowered onto base 3105 such that teeth 1190 of base 3105 mate with gaps 1181 of spacer 3103 and teeth 1180 of spacer 3103 mate with gaps 1191 of base 3105. Subsequent thereto, a lid 101 is threadably engaged with base 3105 and rotated thereon. As the lid 101 is being rotated down neck 131 of base 3105 and approaches spacer 3103, a portion of the end of locking tab 182 will extend upward into one of the plurality of cavities 172 as the cavity 172 passes over locking tab 182. Locking tab 182 will flex downward as lid 101 is rotated and locking tab 182 exits from a particular cavity 172. As described above, the spacing, size and shape of each of the plurality of cavities 172 are such that regardless of the orientation of spacer 3103 with respect to base 3105, when the upper surface 129 of base 3105 engages the upper surface 109 of lid 101, at least a portion of the end of locking tab 182 will extend into one of the plurality of cavities 172 of lid 101. Locking tab 182 is configured to permit the rotation of lid 101 in only one direction. When locking tab 182 extends into one of the cavities 172, locking tab 182 prevents the rotation of lid 101 in one direction while permitting rotation in the opposite direction. Once lid is completely threaded onto base 3105, the location of lid 101 will prevent the movement of spacer 3103 off of the neck of base 3105 and will, in addition to the engagement of the teeth 1180 with gaps 1191 and teeth 1190 with gaps 1182, prevent the rotation of spacer 3103 about base 3105.

In order to remove spacer 3103 and lid 101 from base 3105, the user will depress flexible tab 184 in a downward motion. This motion removes locking tab 182 from the engaged cavity 172. Maintaining the downward depression of flexible tab 184, the lid 101 can then be rotated in a direction opposite from the installation of lid 101 onto base 3105 as described above. When the lid 101 has been sufficiently rotated such that the cavities 172 and the locking tab 182 cannot further engage when the locking tab 182 is in the normal biased position, the user may release the depression of flexible tab 184 and continue rotating lid 101 until removed from base 3105.

Figure 33:
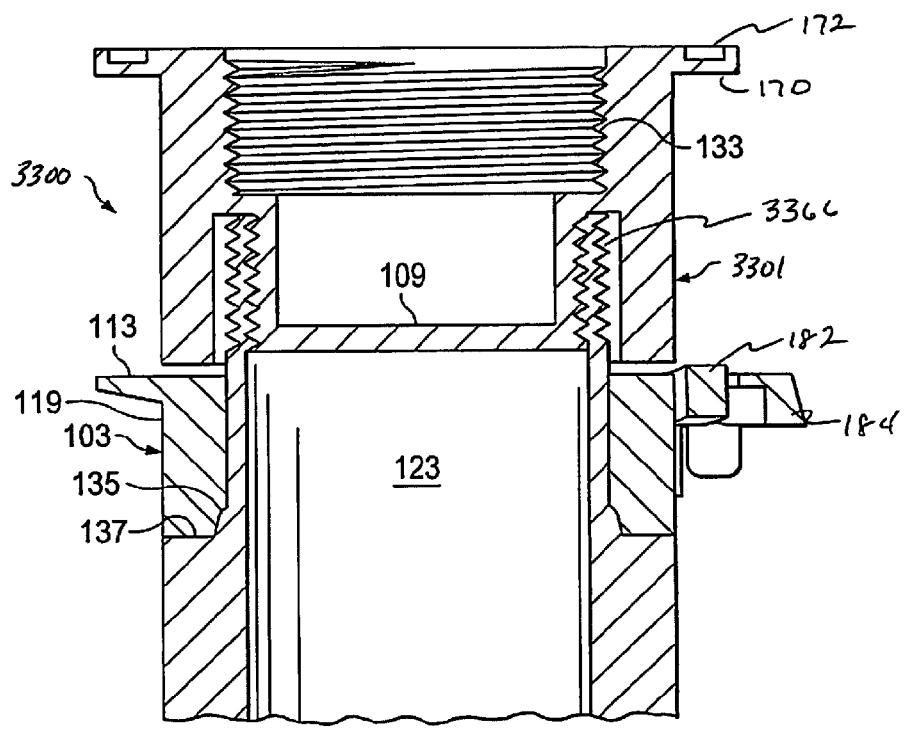
FIG. 33 illustrates a partial cross-sectional view of a programmable container with a cap operable in a locking configuration and a non-locking configuration.

Referring now to FIG. 33, there is illustrated a partial cross-section of an alternative embodiment of a time container 3300 with a reversible lid 3301. As illustrated the top portion of lid 3301 is configured and operates similar to the lid as described herein in relation to at least FIGS. 16-20. However, lid 3301 includes a threaded cavity 3366 on the end opposite threaded portion 133. Lid 3301 is configured such that either threaded end can be placed upon base 105. When threaded end 133 is placed and threaded upon 105 (as described herein above with respect to FIGS. 16-20), lid 3301 will be locked upon base 105 through the interactions of tab 182 and cavity 172. When threaded end 3366 is place and threaded upon base 105, there is no engagement of a locking mechanism to lock lid 3301 onto base 105. The permits the easy removal of lid 3301 from base 105. As can be appreciated, this embodiment gives a user a choice as to whether the lid 3301 should be lock upon base 105 or not.

Although representative embodiments and advantages have been described in detail, it should be understood that various changes, substitutions and alterations can be made herein without departing from the spirit and scope of the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure that processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A time programmable container comprising:
    a base having a first end and a second end with the second end being cylindrical in shape, with the perimeter of the base at the first end being greater than the perimeter of the base at the second end, the base being threaded at the second end, the base having a transition area intermediate the first end and the second end, the transition area where the perimeter of the base changes from the perimeter of first end to the perimeter of the second end, the base further including a plurality of shaped projections positioned around the perimeter of the second end proximate the transition area;
    a spacer having a first end and a second end, the spacer having an aperture extending from the first end to the second end, the aperture having a perimeter greater that the perimeter of the second end of the base and less that the perimeter of the first end of the base, the spacer including a plurality of shapes positioned around the perimeter of the aperture at the second end of the spacer, each of the plurality of shapes of the spacer configured to mate with at least one of the plurality of projections of the base, the aperture of the spacer to be placed over the second end of the base and positioned so that at least one of the plurality of projections of the base mates with at least one shape the spacer, said spacer of a length such that when placed on the base the first end of the spacer is below at least a portion of the threads of the second end of the base;
    a lid having a threaded cavity with the threaded cavity configured to threadably mate with the threaded second end of the base;
    a locking device operable between a first position and a second position, the locking device for locking the lid onto the base, such that when the spacer is placed on the base and subsequent thereto the lid has been threaded onto the base the locking device operates in the first position and locks the lid onto the base and further when the locking device operates in the second position, the lid is unlocked from the base and removable therefrom;
    the locking device including at least one cavity positioned around the perimeter of the threaded cavity of the lid; and
    the locking device including a first tab positioned on the perimeter of the first end of the spacer, the first tab moveable between a first position and a second position, the tab being normally biased in the first position, wherein the cavity of the perimeter of the lid is shaped to receive the first tab of the spacer, such that when the spacer has been placed on the base and the lid has been threaded onto the base, the locking device is in the first position with the first tab of the spacer extending into the cavity of the perimeter of the lid;
    the locking device including a flexible second tab connected to the perimeter of the first end of the spacer and the first tab, such that when the second tab is flexed the first tab is removed from the cavity of the lid, thereby permitting the removal of the lid from the base.

2. A time programmable container comprising:
    a base having a cylindrical first end and a cylindrical second end, with the circumference of the base at the first end being greater than the circumference of the base at the second end, the base being threaded at the second end, the base having a transition area intermediate the first end and the second end, the transition area where the circumference of the base changes from the first end to the second end, the base further including a plurality of locking members positioned around the circumference of the second end proximate the transition area;
    a cylindrical spacer having a first end and a second end, the spacer having an aperture extending from the first end to the second end, the aperture having a circumference greater that the circumference of the second end of the base and less that the circumference of the first end of the base, the spacer including a plurality of depressions positioned around the circumference of the aperture at the second end of the spacer, each of the plurality of depressions configured to fit over locking member of the base and shaped to complement the shape a locking member, the aperture of the spacer to be placed over the second end of the base and positioned so that at least one locking member of the base mates with at least one depression of the spacer, said spacer of a length such that when placed on the base the first end of the spacer is below at least a portion of the threads of the second end of the base;
    a lid having a threaded cavity with the threaded cavity configured to threadably mate with the threaded second end of the base; and
    a lid locking device operable between a first position and a second position, the locking device for locking the lid onto the base, such that when the spacer is placed on the base and subsequent thereto the lid has been threaded onto the base the locking device operates in the first position and locks the lid onto the base and further when the locking device operates in the second position, the lid is unlocked from the base and removable therefrom;
    the lid locking device including at least one cavity positioned around the perimeter of the threaded cavity of the lid; and
    the lid locking device including a first tab positioned on the perimeter of the first end of the spacer, the first tab moveable between a first position and a second position, the first tab being normally biased in the first position, wherein the perimeter cavity of the lid is shaped to receive the first tab of the spacer, such that when the spacer has been placed on the base and the lid has been threaded onto the base, the lid locking device is in the first position with the first tab of the spacer extending into the cavity of the perimeter of the lid; and the lid locking device including a flexible second tab connected to the perimeter of the first end of the spacer and the first tab, such that when the second tab is flexed, the first tab is removed of the cavity of the lid, thereby permitting the removal of the lid from the base.

3. A time programmable container comprising:

a base having a first end and a second end with the second end being cylindrical in shape, with the perimeter of the base at the first end being greater than the perimeter of the base at the second end, the base being threaded at the second end, the base having a transition area intermediate the first end and the second end, the transition area where the perimeter of the base changes from the first end to the second end, the base further including a plurality of fingers positioned around the perimeter of the second end proximate the transition area;

a spacer having a first end and a second end, the spacer having an aperture extending from the first end to the second end, the aperture having a perimeter greater that the perimeter of the second end of the base and less that the perimeter of the first end of the base, the spacer including a plurality of depressions positioned around the perimeter of the aperture at the second end of the spacer, each of the plurality of depressions being configured to fit over a finger of the base and shaped to complement the shape of the finger, the aperture of the spacer to be placed over the second end of the base and positioned so that at least one finger of the base mates with at least one depression of the spacer, said spacer of a length such that when placed on the base the first end of the spacer is below at least a portion of the threads of the second end of the base, the spacer including a tab positioned on the perimeter of the first end of the spacer, the tab moveable between a first position and a second position, the tab being normally biased in the first position;

a flexible tab connected to the perimeter of the first end of the spacer;

a lid having a threaded cavity with the threaded cavity configured to threadably mate with the threaded second end of the base, the lid further including a plurality of cavities positioned about the perimeter of the threaded cavity; and wherein when the spacer is placed on the base and subsequent thereto the lid has been threaded onto the base, the tab of the spacer extends into one of the plurality of cavities positioned about the perimeter of the threaded cavity locking the lid onto the base and further wherein when the flexible tab is depressed the tab of the spacer is removed from the one of the plurality of cavities, the lid is unlocked from the base and removable therefrom.

4. The time programmable container of claim 3, wherein the lid includes a second threaded cavity at an end of the lid opposite the first threaded cavity, the second threaded cavity configure to threadably mate with the threads of the second end of the base.

5. The time programmable container of claim 4, and further including time indicia on the outer perimeter of the spacer.

6. The time programmable container of claim 5, and further including an alignment indicator on the base, the alignment indicator to indicate a selected one of the time indicia of the spacer.

\* \* \* \* \*